United States Patent
Zimmerman et al.

(10) Patent No.: US 12,370,506 B2
(45) Date of Patent: Jul. 29, 2025

(54) FLUIDIC OSCILATORS

(71) Applicant: Perlemax Limited, Sheffield (GB)

(72) Inventors: William Bauer Jay Zimmerman, Sheffield (GB); Pratik Devang Desai, Sheffield (GB)

(73) Assignee: PERLEMAX LIMITED, Sheffield (GB)

( * ) Notice: Subject to any disclaimer, the term of this patent is extended or adjusted under 35 U.S.C. 154(b) by 0 days.

(21) Appl. No.: 17/601,872

(22) PCT Filed: Apr. 11, 2020

(86) PCT No.: PCT/EP2020/060357
§ 371 (c)(1),
(2) Date: Oct. 6, 2021

(87) PCT Pub. No.: WO2020/208250
PCT Pub. Date: Oct. 15, 2020

(65) Prior Publication Data
US 2022/0168697 A1  Jun. 2, 2022

(30) Foreign Application Priority Data

Apr. 11, 2019 (GB) .................................. 1905126.7

(51) Int. Cl.
*B01F 23/23* (2022.01)
*B01F 23/2373* (2022.01)
(Continued)

(52) U.S. Cl.
CPC ........ *B01F 23/238* (2022.01); *B01F 23/2366* (2022.01); *B01F 23/2373* (2022.01); *B01F 31/81* (2022.01); *F15B 21/12* (2013.01)

(58) Field of Classification Search
CPC .......................... B01F 23/238; B01F 23/2366; B01F 23/2373; B01F 31/81; B01F 33/30;
(Continued)

(56) References Cited

U.S. PATENT DOCUMENTS 3,159,168 A * 12/1964 Reader ...................... F15C 1/08
137/835
3,185,166 A * 5/1965 Horton ...................... F15C 1/08
137/821
(Continued)

FOREIGN PATENT DOCUMENTS

CN   1596492 A   3/2005
CN   102405109 A   4/2012
(Continued)

OTHER PUBLICATIONS

International Search Report for PCT Application No. PCT/EP2020/060357 mailed Aug. 26, 2020 (5 pages).
(Continued)

*Primary Examiner* — Stephen Hobson
(74) *Attorney, Agent, or Firm* — Merchant & Gould P.C.

(57) ABSTRACT

A fluidic oscillator includes at least one inlet port (57) in communication with at least two outlets (61) via a nozzle region and two outlet conduits (58, 62), the two outlet conduits being separated from each other by a splitter region. Each outlet conduit includes a resonance chamber (60) in fluid communication with the conduit. The resonance chambers contribute to controlling the oscillation of the device. The fluidic oscillator is operatable in an acoustic switching mode.

14 Claims, 24 Drawing Sheets

(51) Int. Cl.
*B01F 31/81* (2022.01)
*F15B 21/12* (2006.01)

(58) Field of Classification Search
CPC ........ F15B 21/12; C02F 2303/26; C02F 1/20;
C02F 2101/16; F15C 1/22; F15C 1/008
See application file for complete search history.

(56) References Cited

U.S. PATENT DOCUMENTS

| | | | | |
|---|---|---|---|---|
| 3,729,702 | A * | 4/1973 | Beeken | G01H 3/10 |
| | | | | 181/123 |
| 3,841,392 | A * | 10/1974 | Osheroff | F15C 1/008 |
| | | | | 165/123 |
| 3,876,016 | A * | 4/1975 | Stinson | G01V 1/42 |
| | | | | 175/45 |
| 3,923,244 | A * | 12/1975 | Osheroff | F24F 11/76 |
| | | | | 137/826 |
| 4,227,550 | A * | 10/1980 | Bauer | F15C 1/22 |
| | | | | 137/806 |
| 4,275,794 | A * | 6/1981 | Carbonaro | E21B 4/14 |
| | | | | 173/73 |
| 4,482,366 | A * | 11/1984 | Camplin | F15C 1/22 |
| | | | | 96/426 |
| 4,630,689 | A * | 12/1986 | Galle | E21B 7/24 |
| | | | | 137/804 |
| 4,825,421 | A * | 4/1989 | Jeter | E21B 47/18 |
| | | | | 367/83 |
| RE33,448 | E * | 11/1990 | Bauer | F15C 1/22 |
| | | | | 137/833 |
| 5,190,099 | A * | 3/1993 | Mon | H01L 23/4735 |
| | | | | 239/589.1 |
| 5,524,660 | A * | 6/1996 | Dugan | F15C 1/22 |
| | | | | 137/833 |
| 5,823,261 | A * | 10/1998 | Drumheller | E21B 43/126 |
| | | | | 340/856.4 |
| 5,893,383 | A * | 4/1999 | Facteau | B05B 1/08 |
| | | | | 137/810 |
| 6,439,866 | B1 * | 8/2002 | Farkas | E21B 4/003 |
| | | | | 418/104 |
| 6,553,844 | B2 * | 4/2003 | Drzewiecki | F15C 1/22 |
| | | | | 73/861.19 |
| 6,581,856 | B1 * | 6/2003 | Srinath | B05B 1/08 |
| | | | | 239/428 |
| 6,805,164 | B2 * | 10/2004 | Stouffer | F15C 1/22 |
| | | | | 137/806 |
| 6,860,157 | B1 * | 3/2005 | Yang | G01F 1/3227 |
| | | | | 73/861.19 |
| 7,096,888 | B1 * | 8/2006 | Thurston | F15C 1/143 |
| | | | | 137/818 |
| 7,128,082 | B1 * | 10/2006 | Cerretelli | B05B 7/0075 |
| | | | | 137/833 |
| 7,464,609 | B2 * | 12/2008 | Fallet | E21B 47/114 |
| | | | | 73/861.19 |
| 7,481,119 | B2 * | 1/2009 | Yang | F15C 1/22 |
| | | | | 73/861.19 |
| 8,287,175 | B2 * | 10/2012 | Zimmerman | B01F 23/23121 |
| | | | | 137/561 A |
| 8,439,117 | B2 * | 5/2013 | Schultz | E21B 7/24 |
| | | | | 137/810 |
| 8,616,290 | B2 * | 12/2013 | Dykstra | E21B 34/08 |
| | | | | 166/250.15 |
| 8,657,017 | B2 * | 2/2014 | Dykstra | E21B 43/14 |
| | | | | 137/806 |
| 8,770,229 | B2 * | 7/2014 | Gopalan | F15C 1/22 |
| | | | | 137/841 |
| 9,291,032 | B2 * | 3/2016 | Greci | E21B 43/12 |
| 9,316,065 | B1 * | 4/2016 | Schultz | E21B 31/035 |
| 9,404,349 | B2 * | 8/2016 | Zhao | E21B 34/08 |
| 9,506,320 | B2 * | 11/2016 | Dykstra | E21B 43/14 |
| 9,618,150 | B2 * | 4/2017 | Bauer | F16L 41/00 |
| 9,695,654 | B2 * | 7/2017 | Stephenson | E21B 21/01 |
| 9,987,639 | B2 * | 6/2018 | Russell | B05B 1/304 |
| 10,066,351 | B2 * | 9/2018 | Gopalan | B05B 1/005 |
| 10,532,367 | B2 * | 1/2020 | Gopalan | B05B 1/3478 |
| 10,646,886 | B2 * | 5/2020 | Bobusch | B05B 15/40 |
| 10,781,654 | B1 * | 9/2020 | Schultz | E21B 37/10 |
| 11,434,945 | B2 * | 9/2022 | Seifert | F15C 1/22 |
| 11,471,898 | B2 * | 10/2022 | Bobusch | F15B 21/12 |
| 2005/0214147 | A1 * | 9/2005 | Schultz | F15C 1/22 |
| | | | | 417/572 |
| 2006/0201675 | A1 * | 9/2006 | Ferguson | E21B 34/10 |
| | | | | 166/298 |
| 2009/0008088 | A1 * | 1/2009 | Schultz | E21B 36/02 |
| | | | | 166/249 |
| 2009/0178801 | A1 * | 7/2009 | Nguyen | E21B 43/00 |
| | | | | 166/249 |
| 2010/0002534 | A1 * | 1/2010 | Zimmerman | F15C 1/22 |
| | | | | 137/561 A |
| 2011/0286893 | A1 * | 11/2011 | Zimmerman | C01B 13/115 |
| | | | | 422/186.04 |
| 2012/0167994 | A1 * | 7/2012 | Schultz | E21B 28/00 |
| | | | | 137/12 |
| 2018/0134994 | A1 * | 5/2018 | Steele | D06F 35/001 |
| 2022/0168697 | A1 * | 6/2022 | Zimmerman | F15B 21/12 |

FOREIGN PATENT DOCUMENTS

| | | |
|---|---|---|
| CN | 105121025 A | 12/2015 |
| CN | 105569595 A | 5/2016 |
| EP | 2081666 B1 | 10/2011 |
| GB | 1219747 | 1/1971 |
| WO | 03049241 A1 | 6/2003 |
| WO | 2008053174 A1 | 5/2008 |
| WO | 2010101646 A2 | 9/2010 |
| WO | 2014060740 A1 | 4/2014 |
| WO | 2014093590 A1 | 6/2014 |

OTHER PUBLICATIONS

Written Opinion for PCT Application No. PCT/EP2020/060357 mailed Aug. 26, 2020 (5 pages).
Minutes of Wastewater Innovation Forum Jun. 14, 2017, 4 pgs.
170614—Pratik Desai presentation Water Innovation Forum Jun. 14, 2017, 29 pgs.
Acta Mechanica et Automatica] vol. 9 No. 4 pp. 196-203 (2015)—Fluidic Generator of Microbubbles—Oscillator With Gas Flow Reversal for a Part of Period, 9 pgs.
Pressure Driven Microfluidics. 2007, Artech House Publishers—Author Vaclav Tesar—Chapter_4, 80 pgs.
EPJ Web of Conferences 114, 02121 (2016), Vaclav Tesar et al., 8 pgs.
UK Search Report received for UK application No. GB1905126.7 on Oct. 2, 2019, 4 pgs.
CN Search Report issued for CN Patent Appl. No. 202080032936.6 mailed Feb. 2024 (English translation only).

* cited by examiner

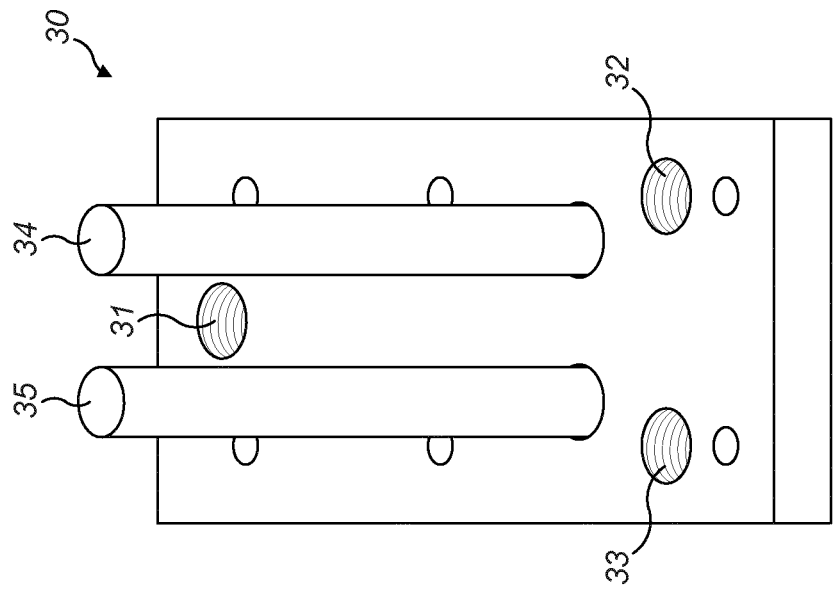
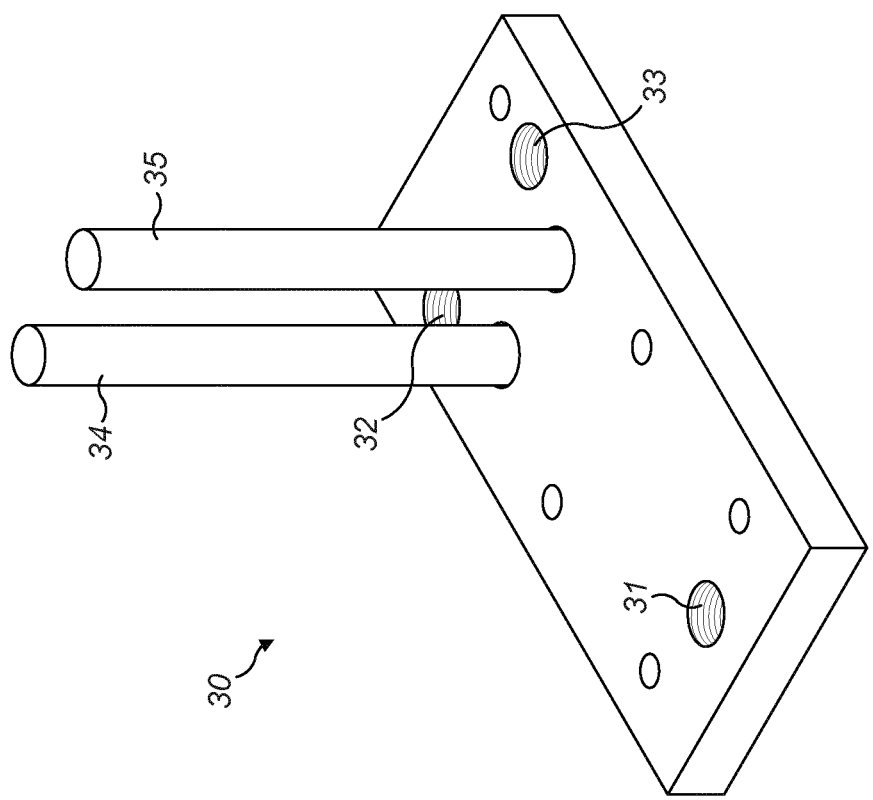
FIG. 3

V₁. Shutdown valve
F₁. Bleed flow meter 1
F₂. Bleed flow meter 2

------- Pneumatic line

1. Pressure regulator
2. Mass flow controller
3. Fluidic oscillator (different types)
4. Pressure transducers
5. Back pressure monitor

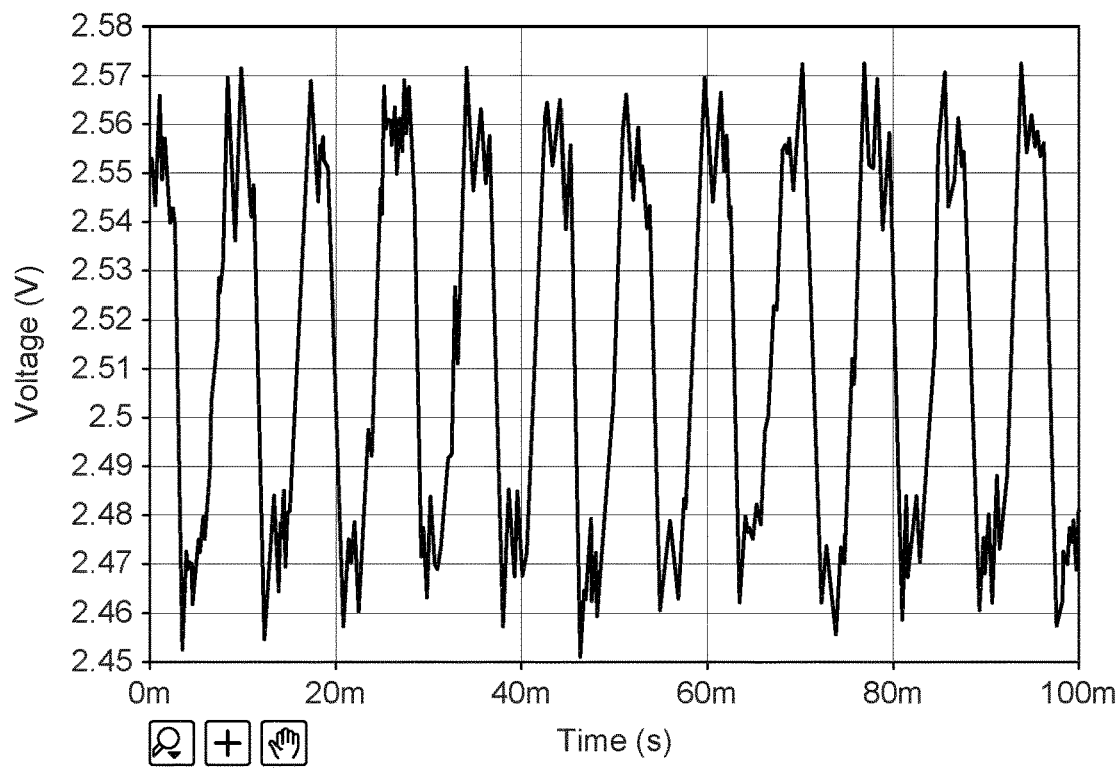
FIG. 10.1
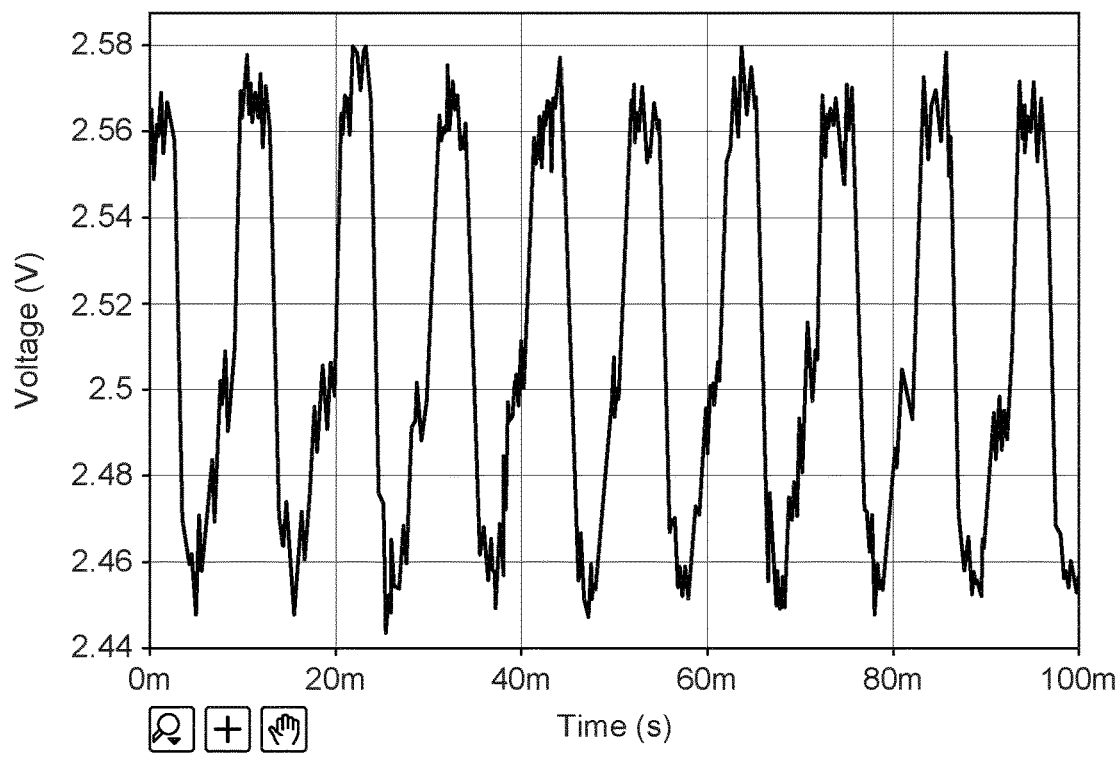
FIG. 10.2

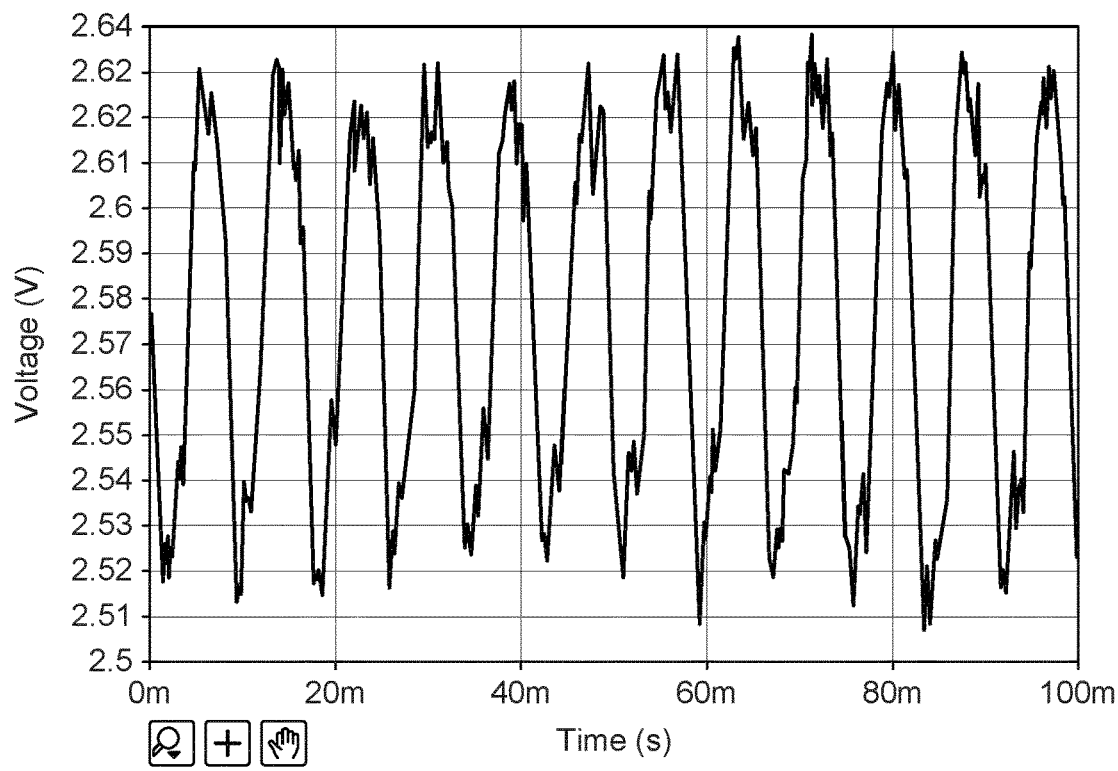
FIG. 10.3
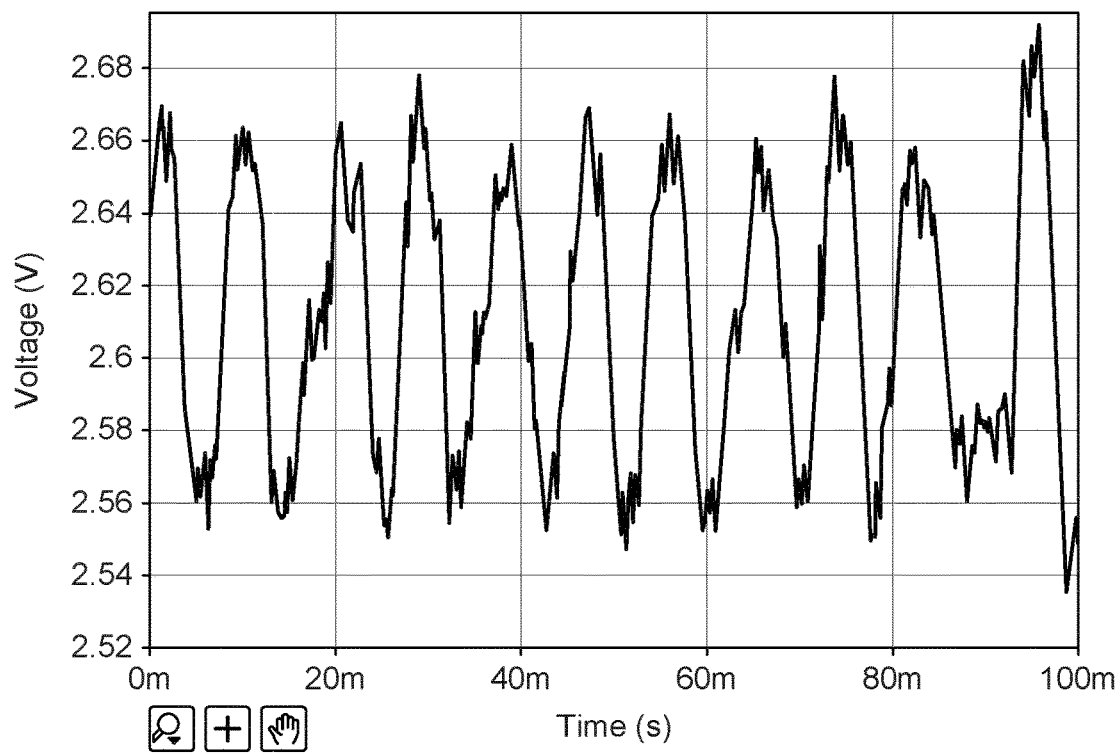
FIG. 10.4

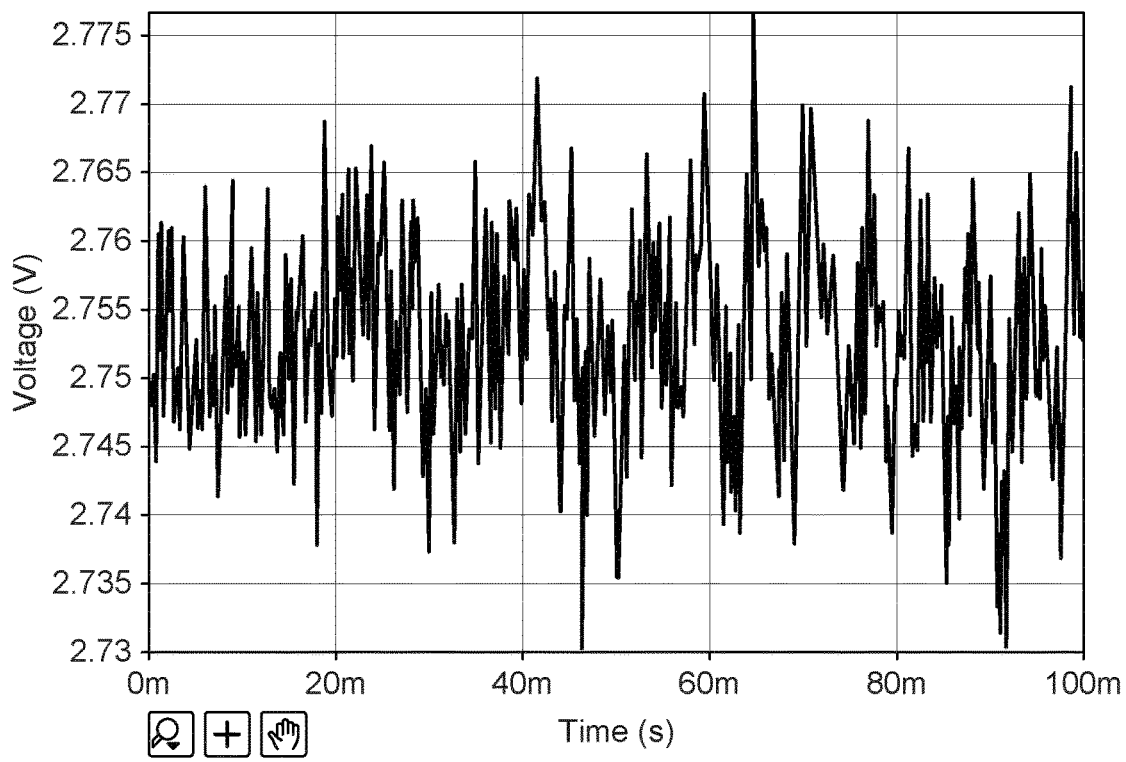
FIG. 10.5
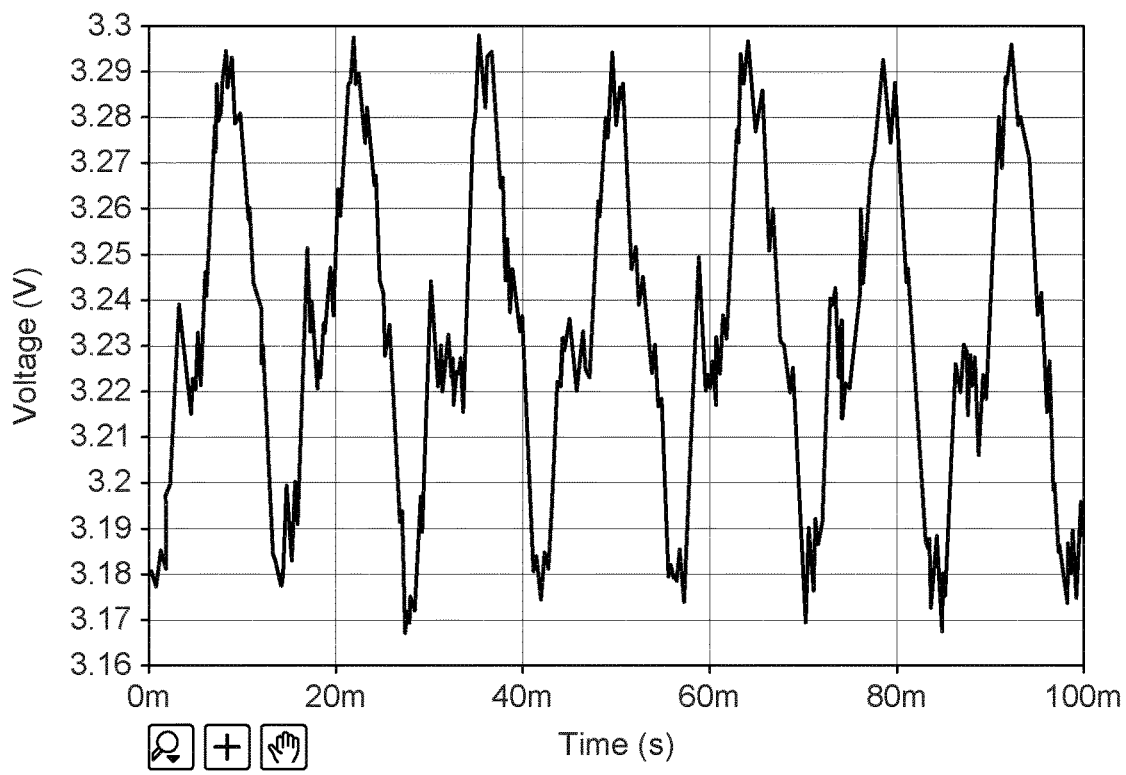
FIG. 10.7

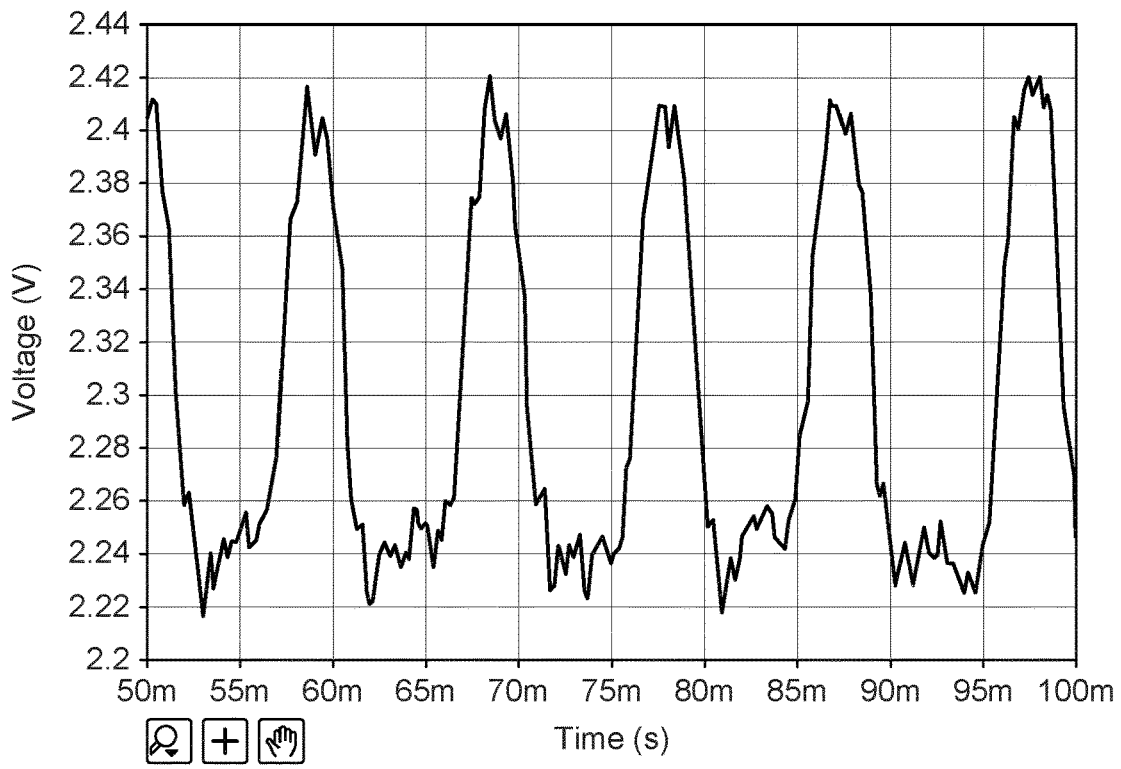
FIG. 10.8
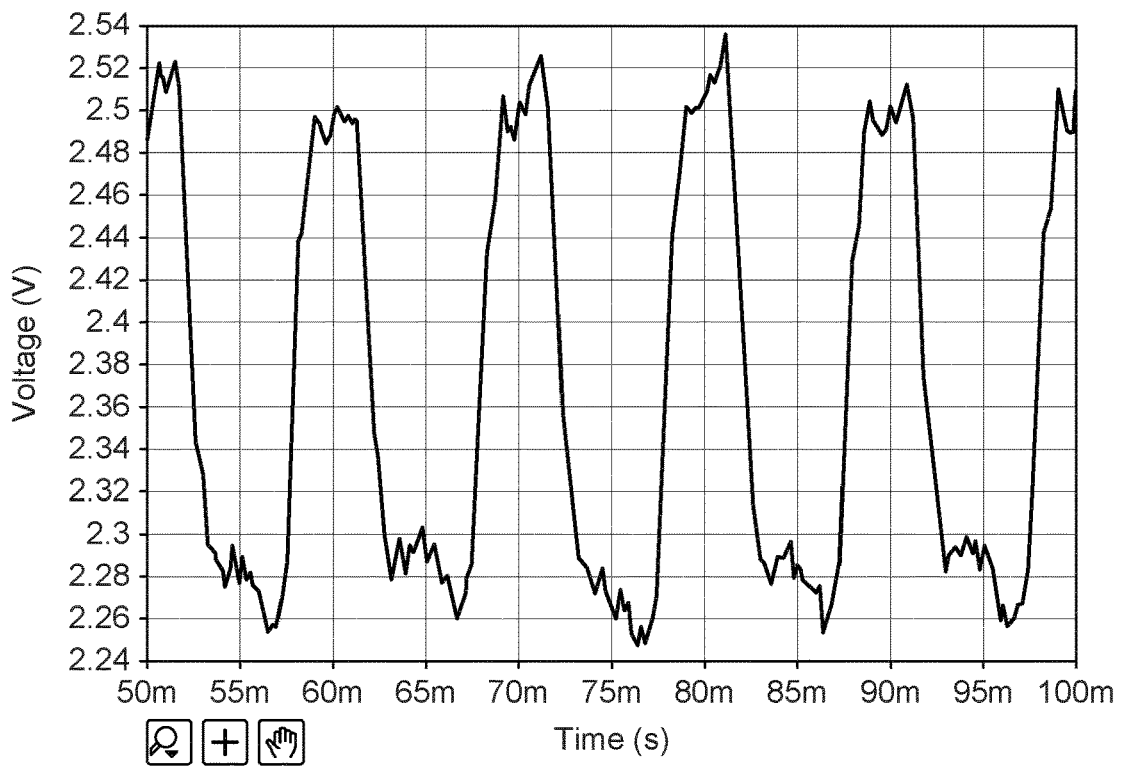
FIG. 10.9

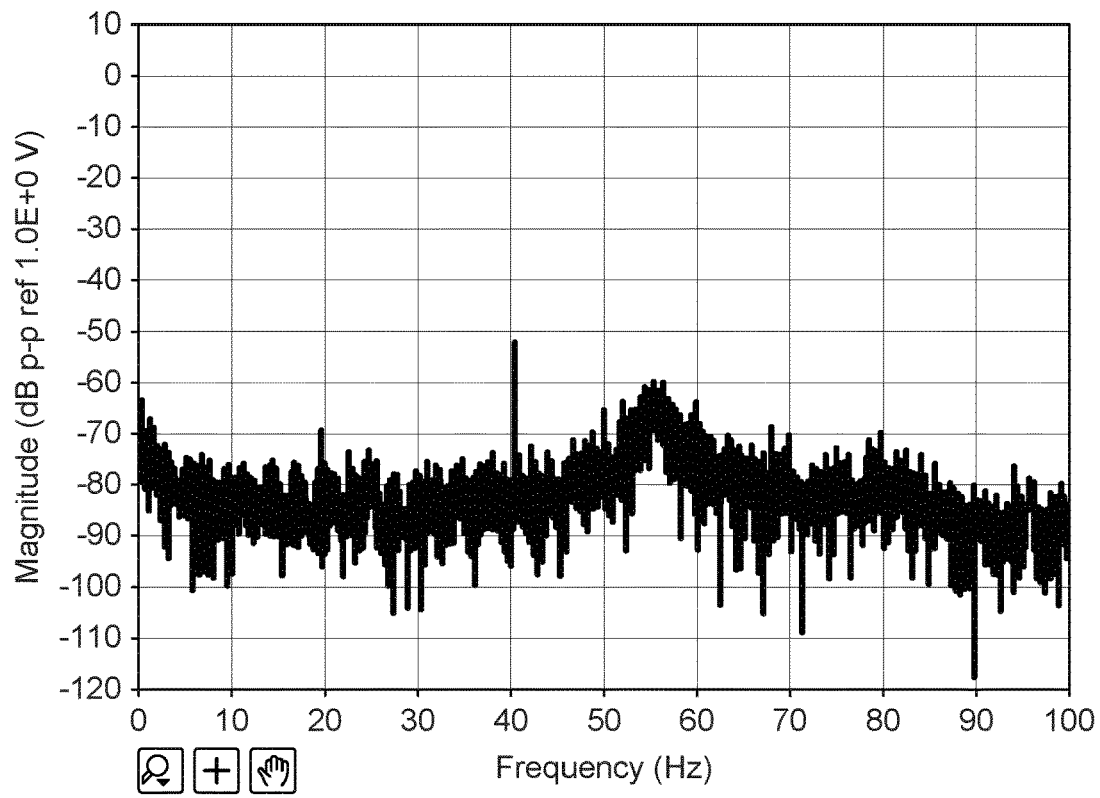
FIG. 12.1
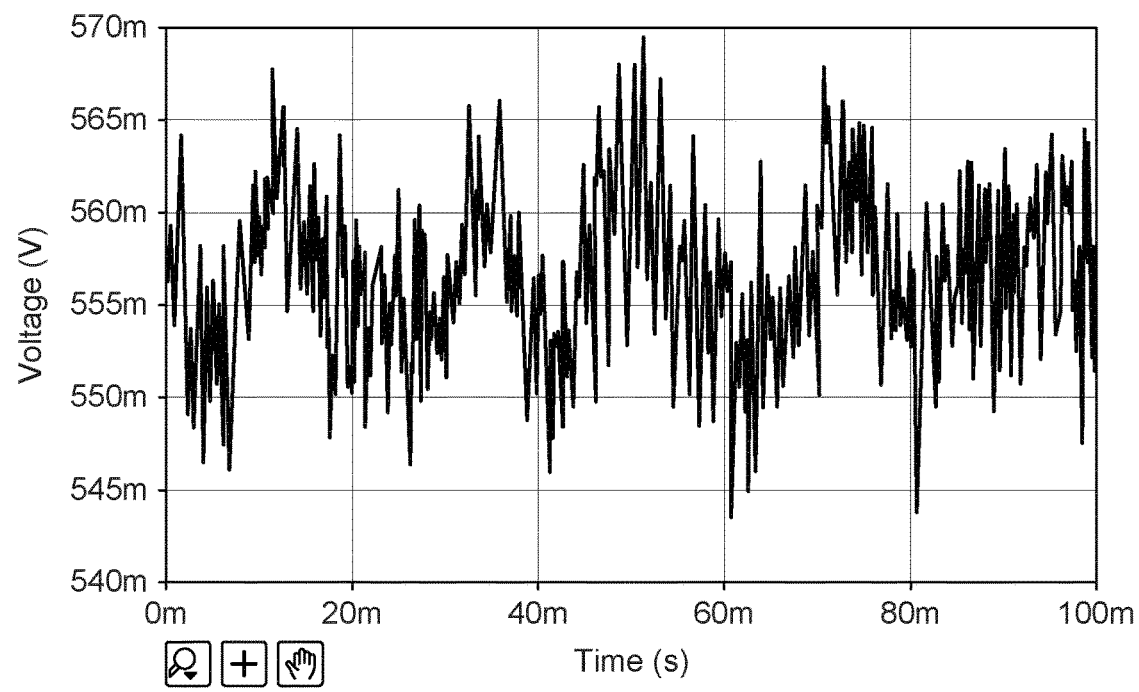
FIG. 12.2

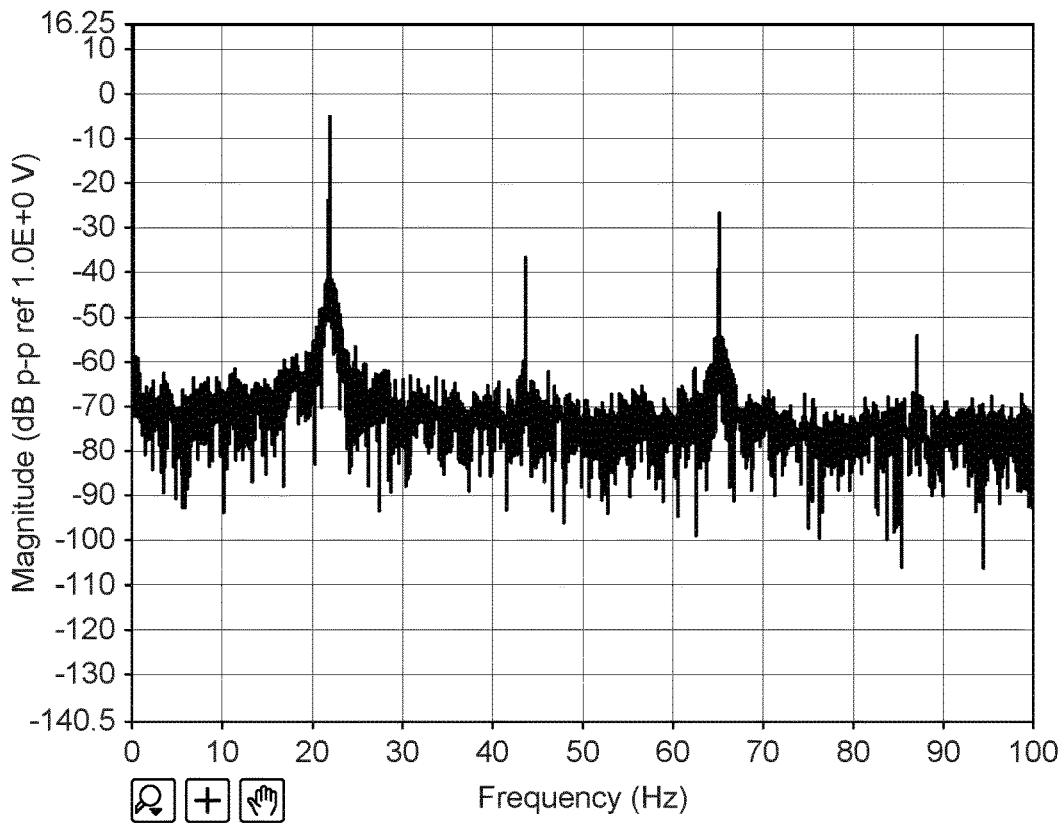
FIG. 12.3
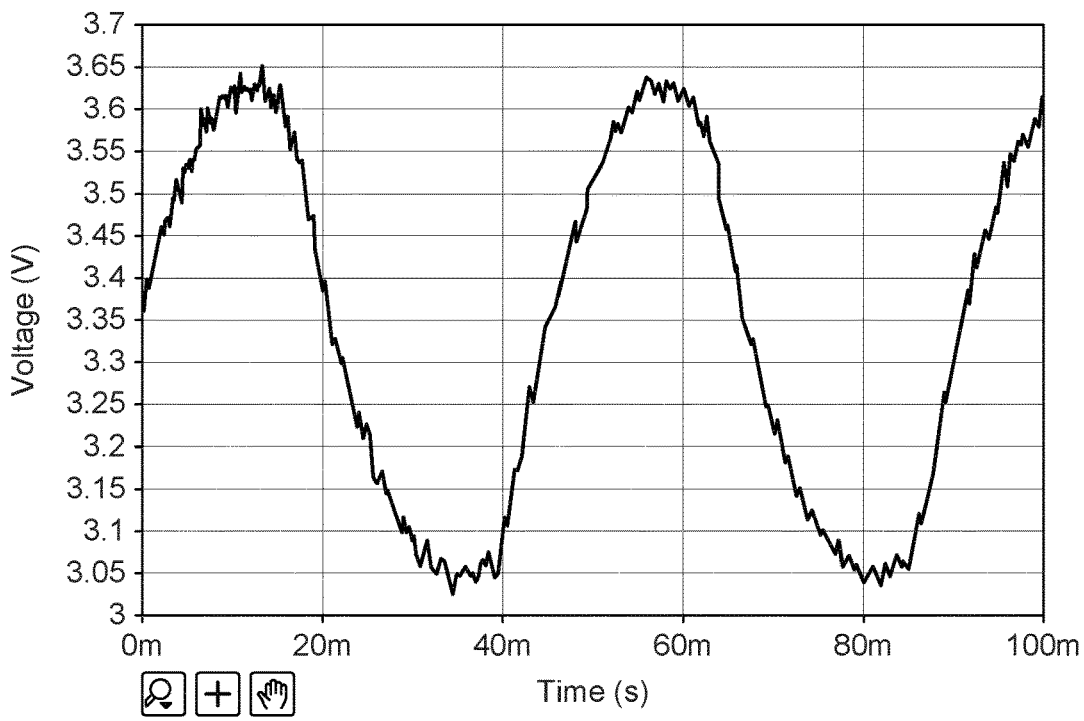
FIG. 12.4

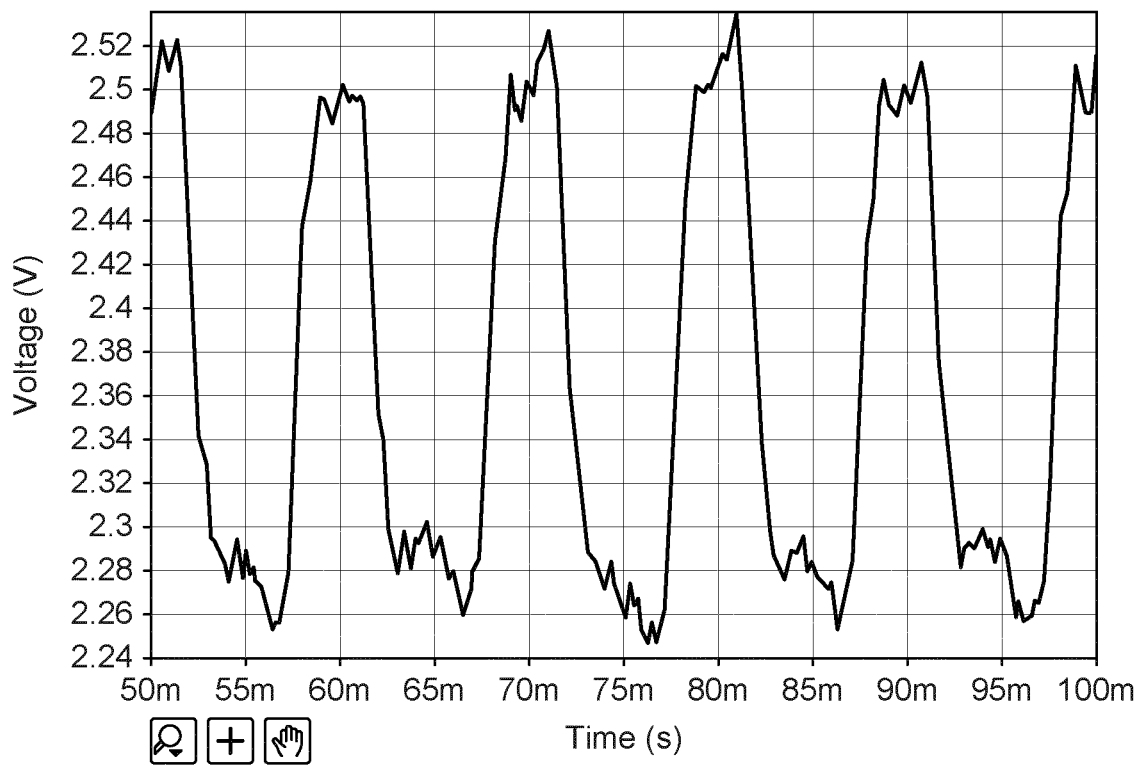
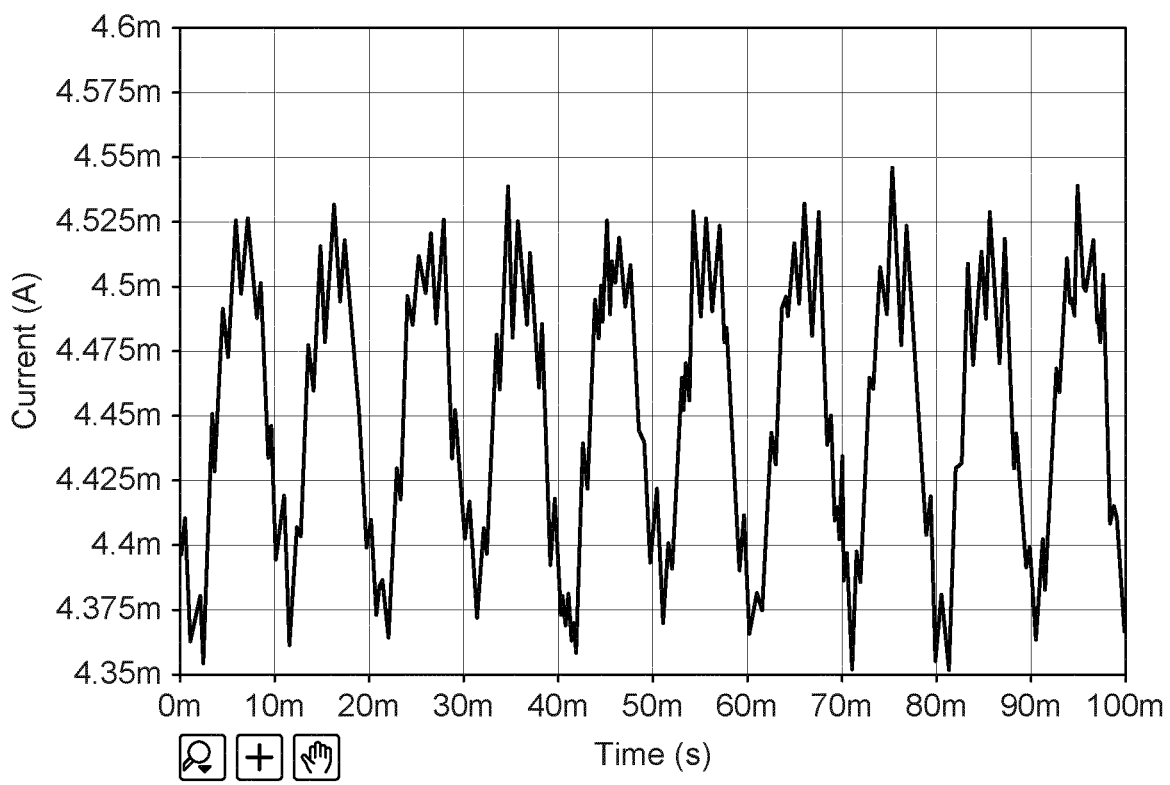
FIG. 13.1

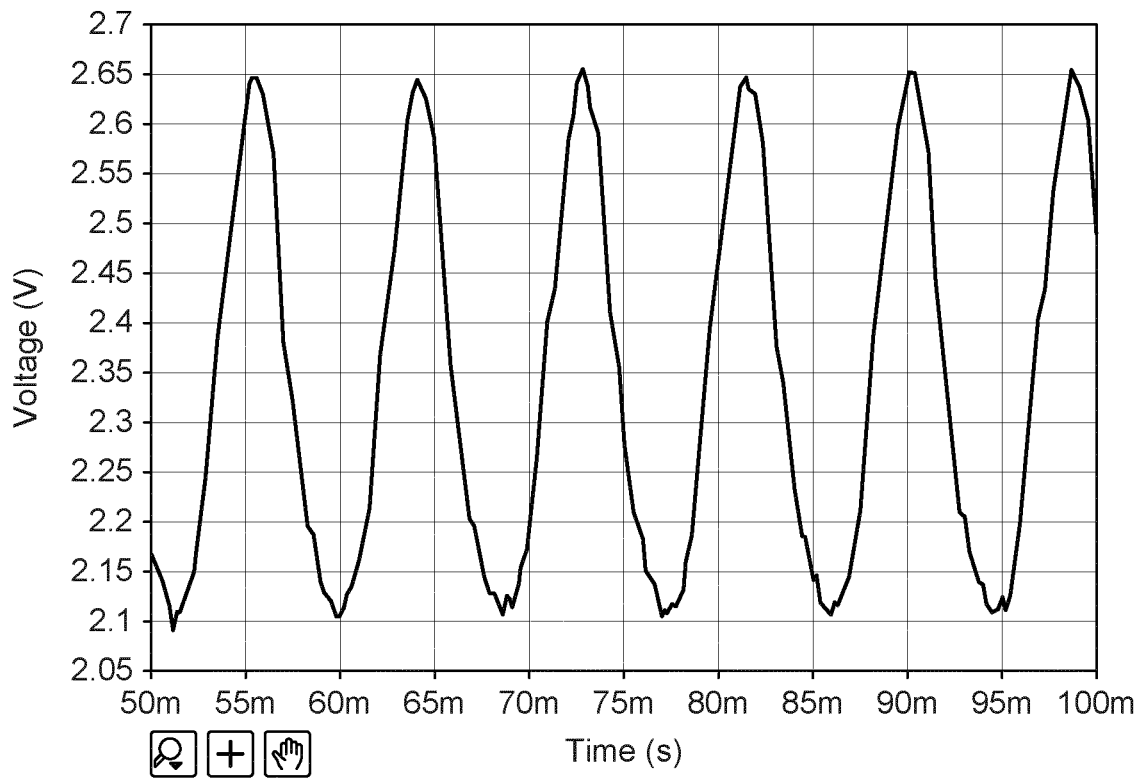
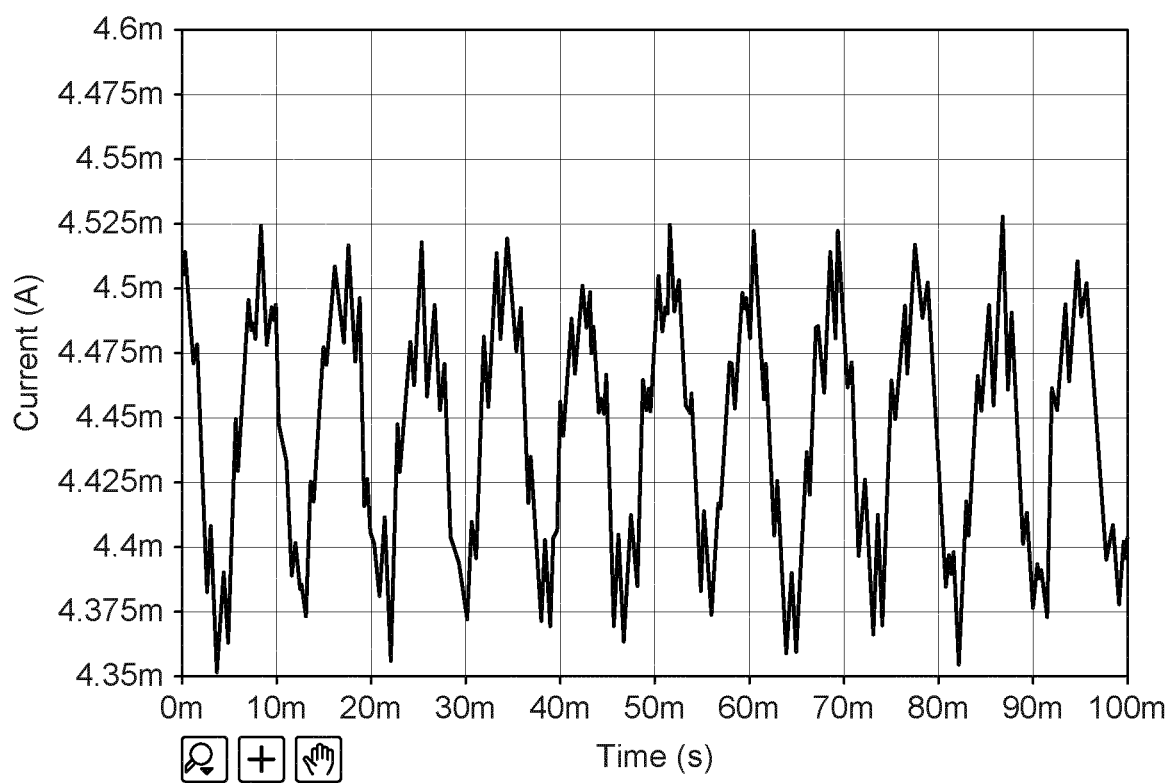
FIG. 13.2

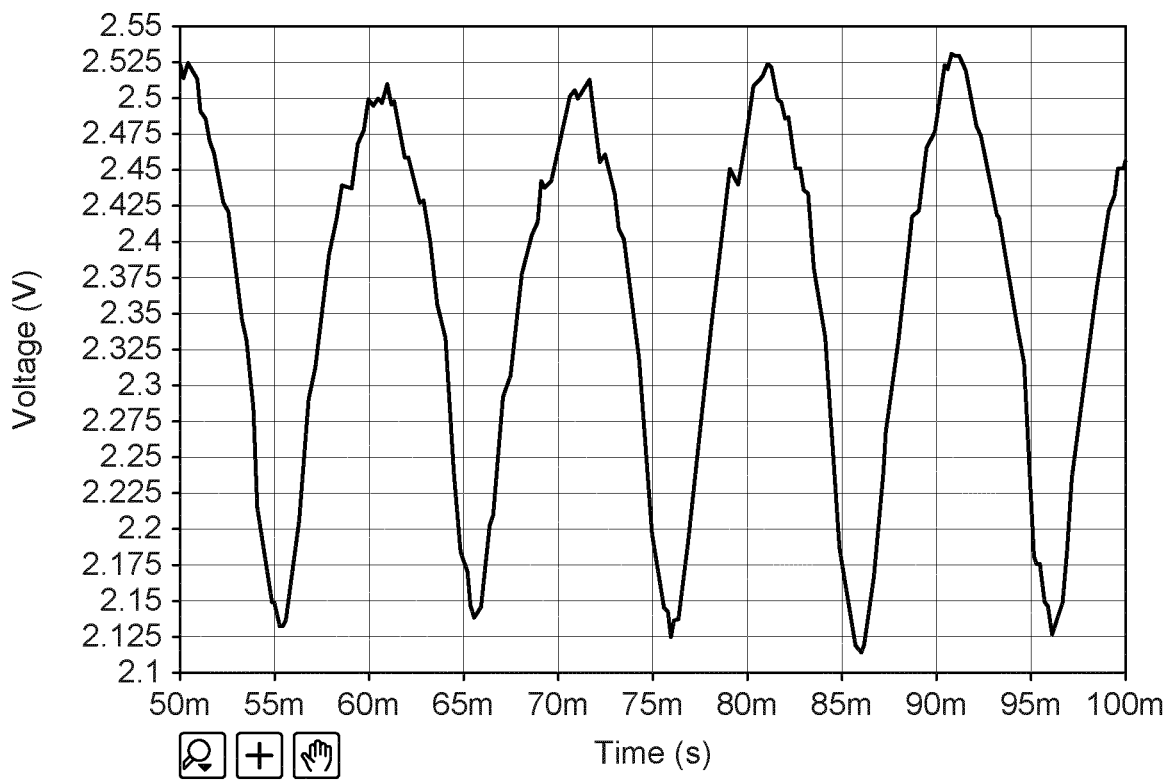
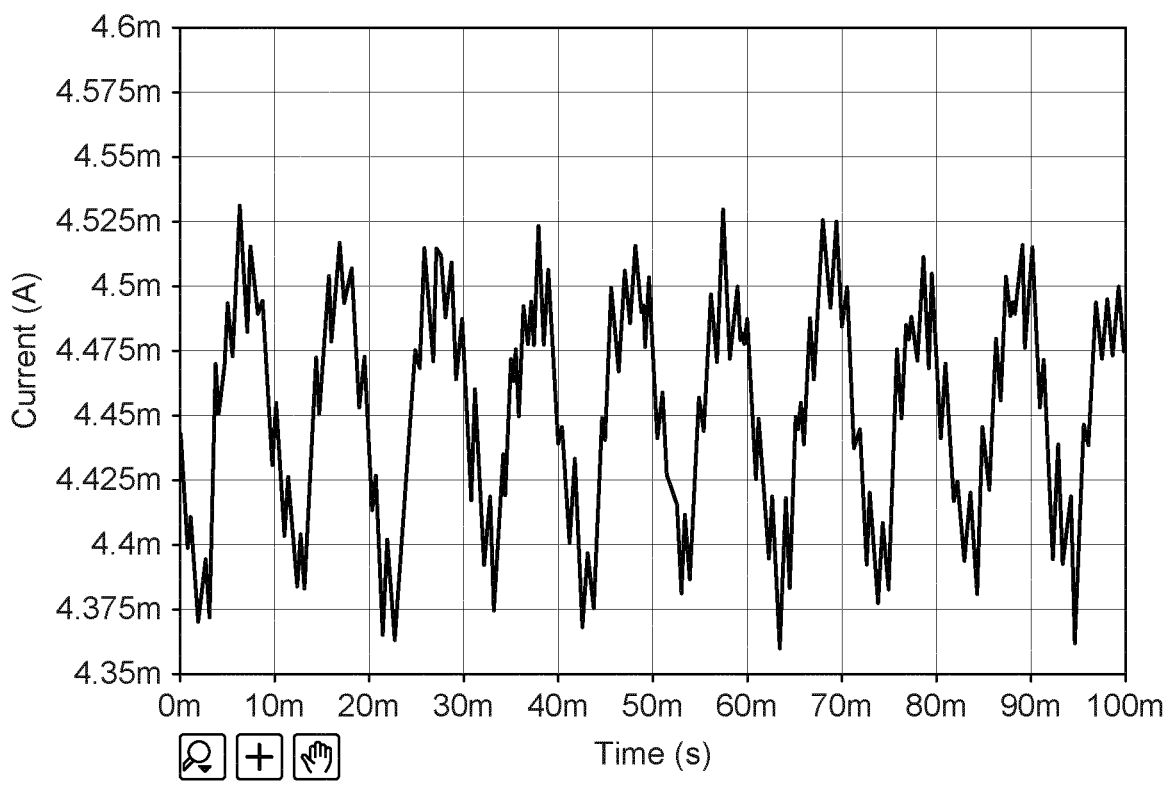
*FIG. 13.3*

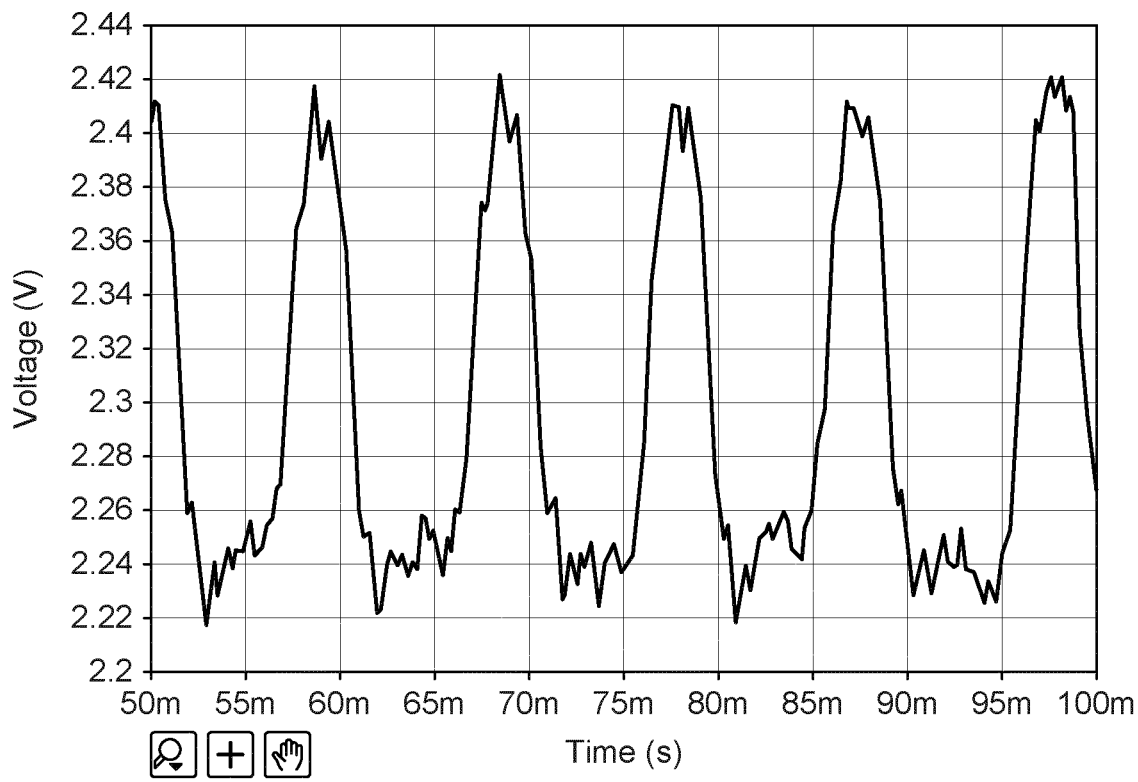
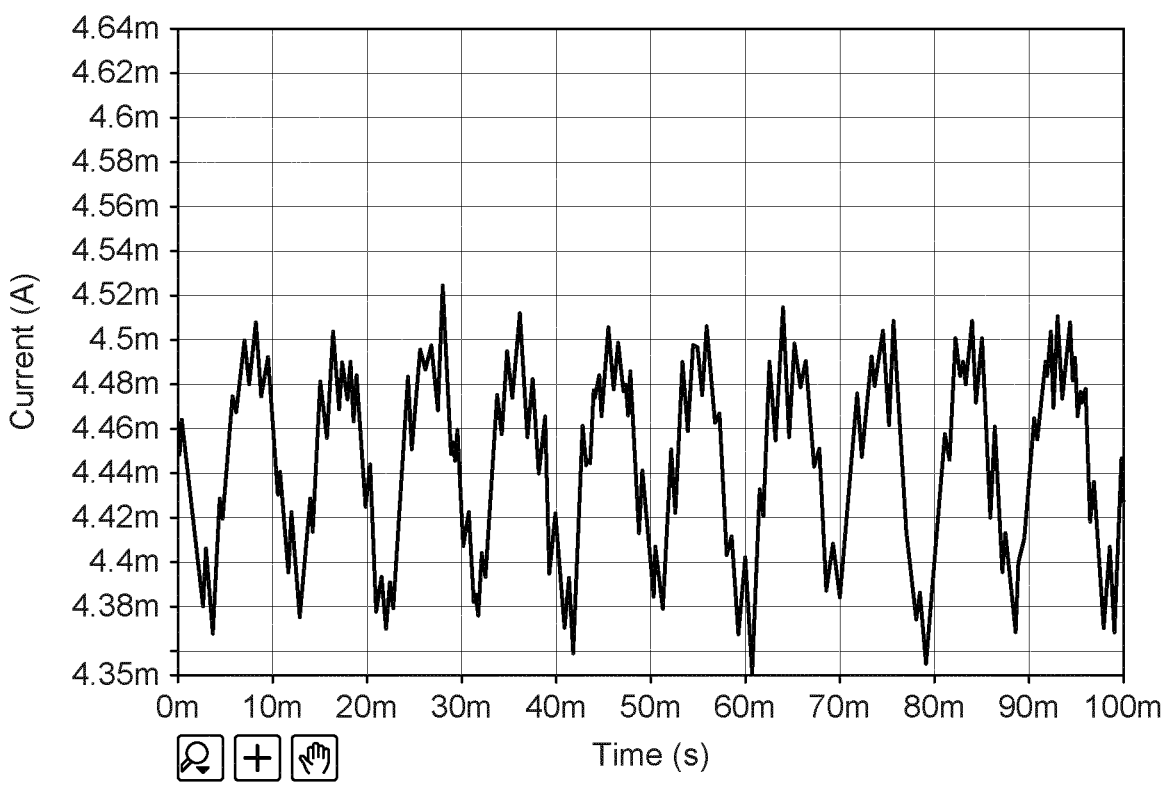
FIG. 13.4

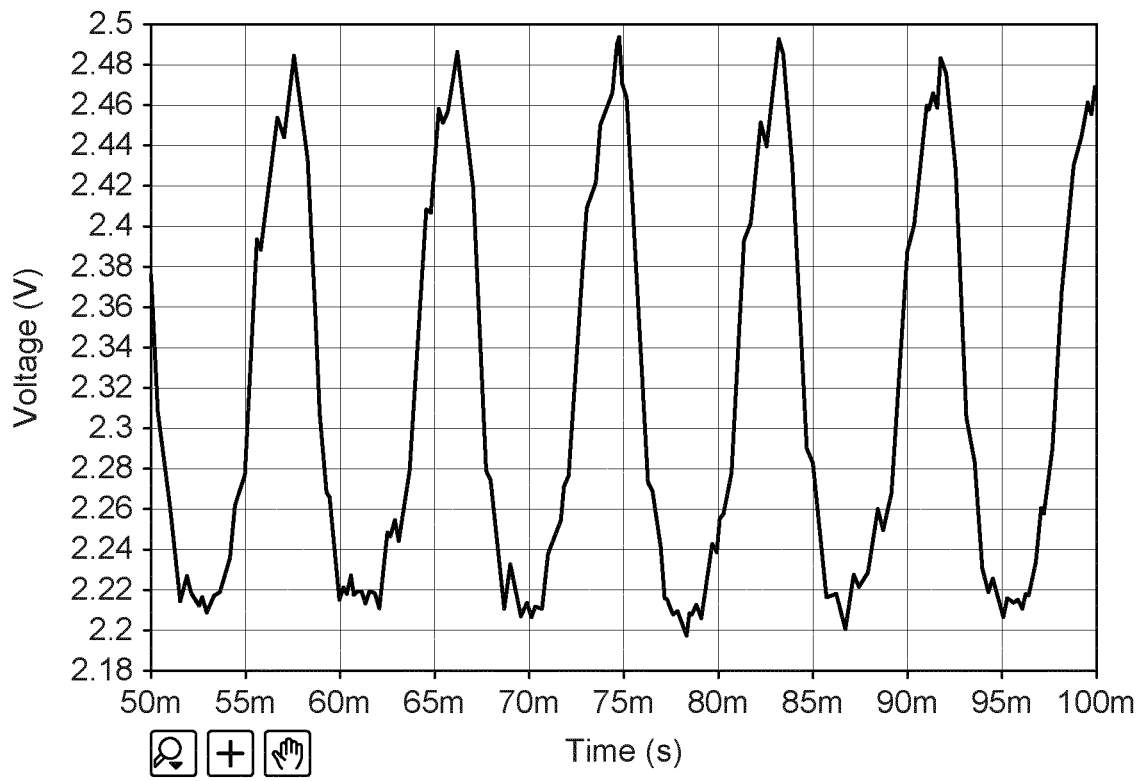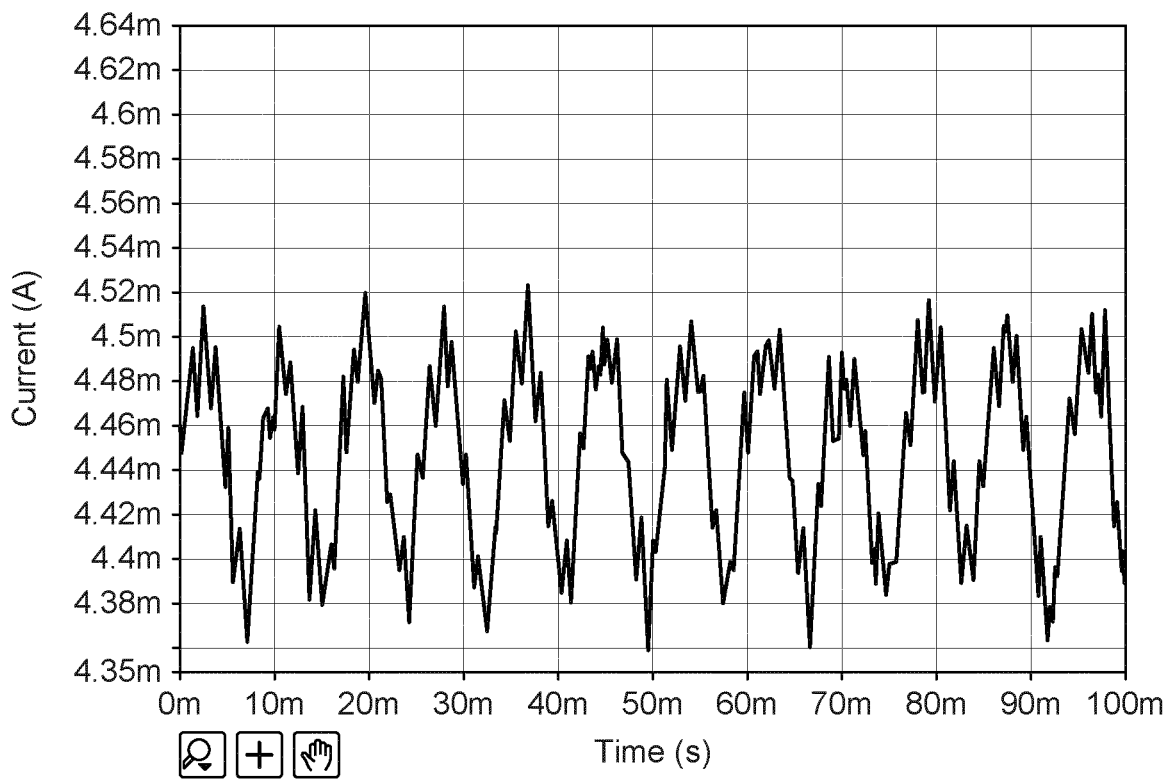
FIG. 13.5

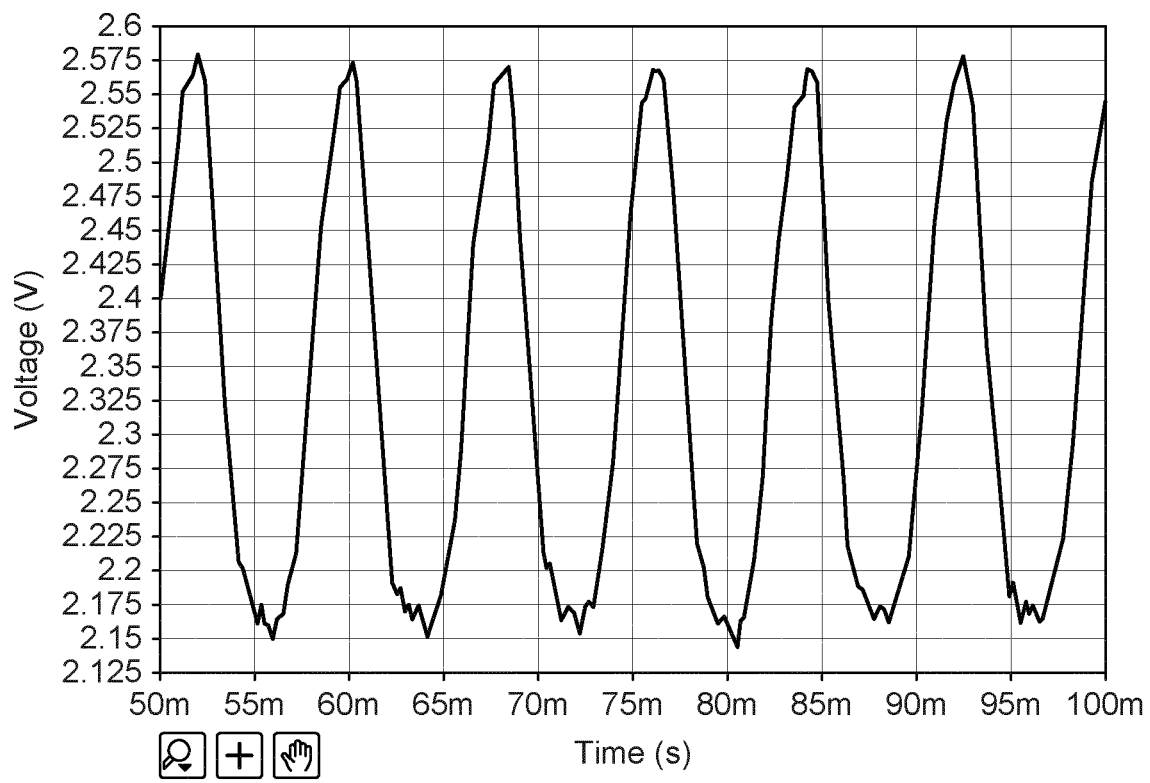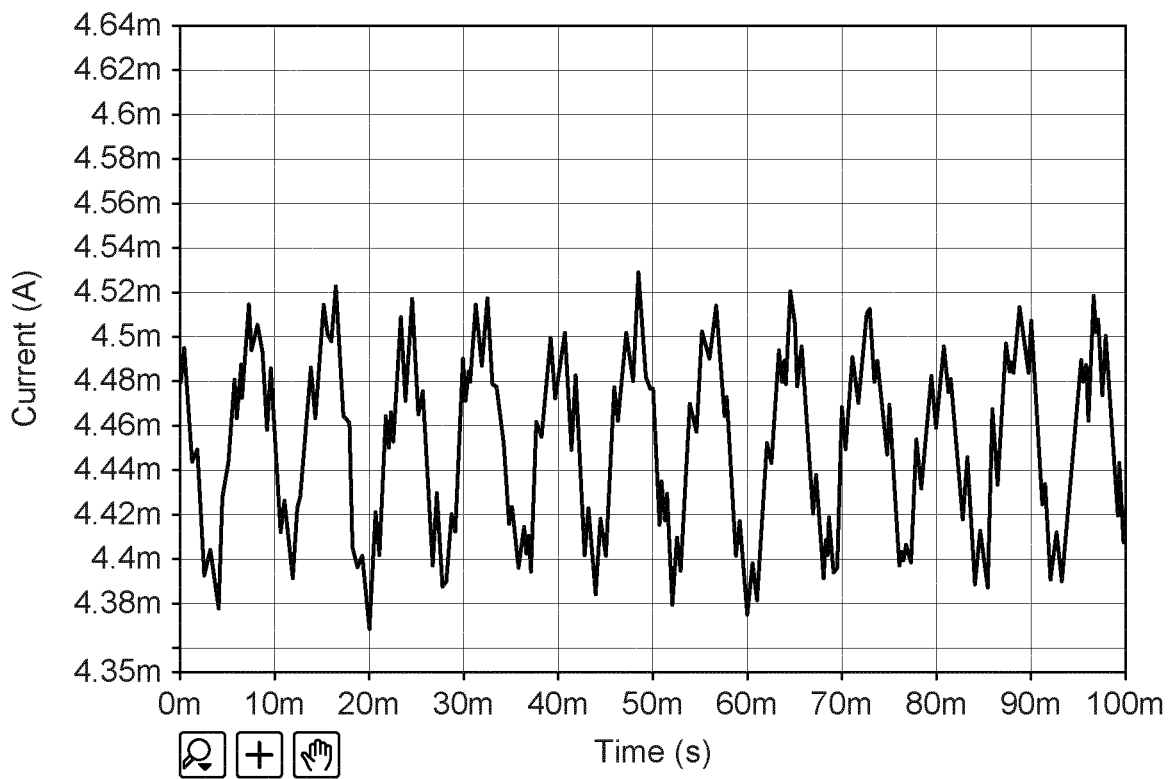
FIG. 13.6

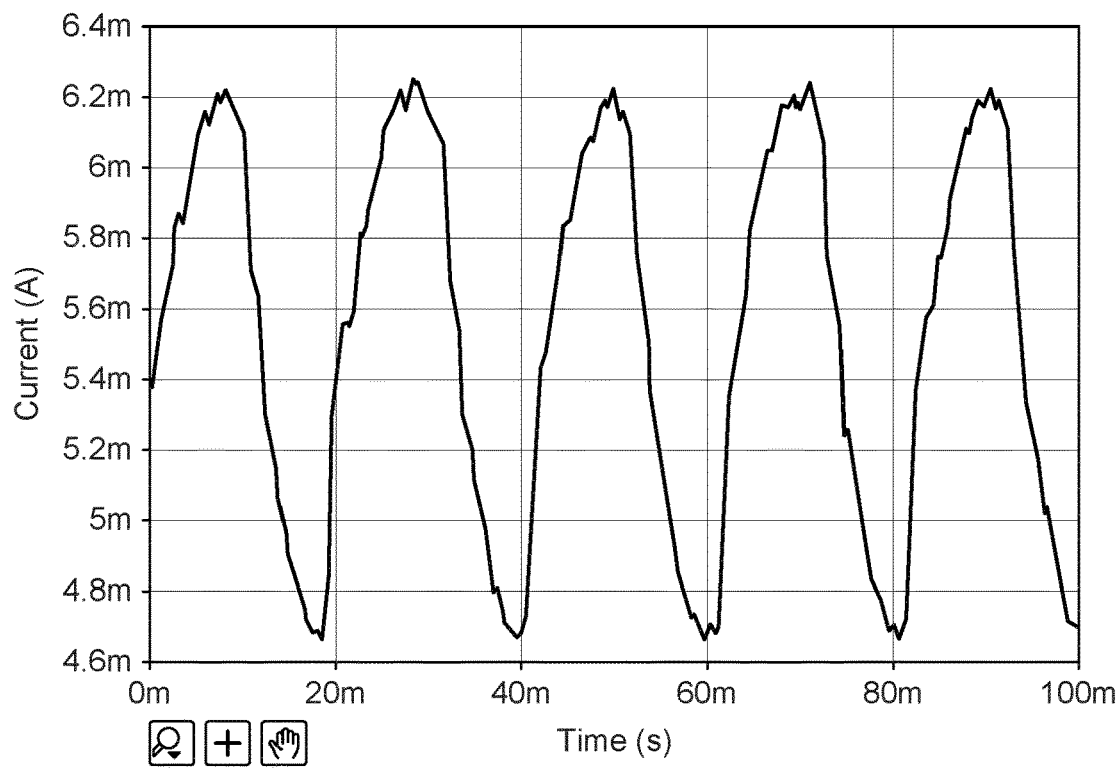
FIG. 14.1
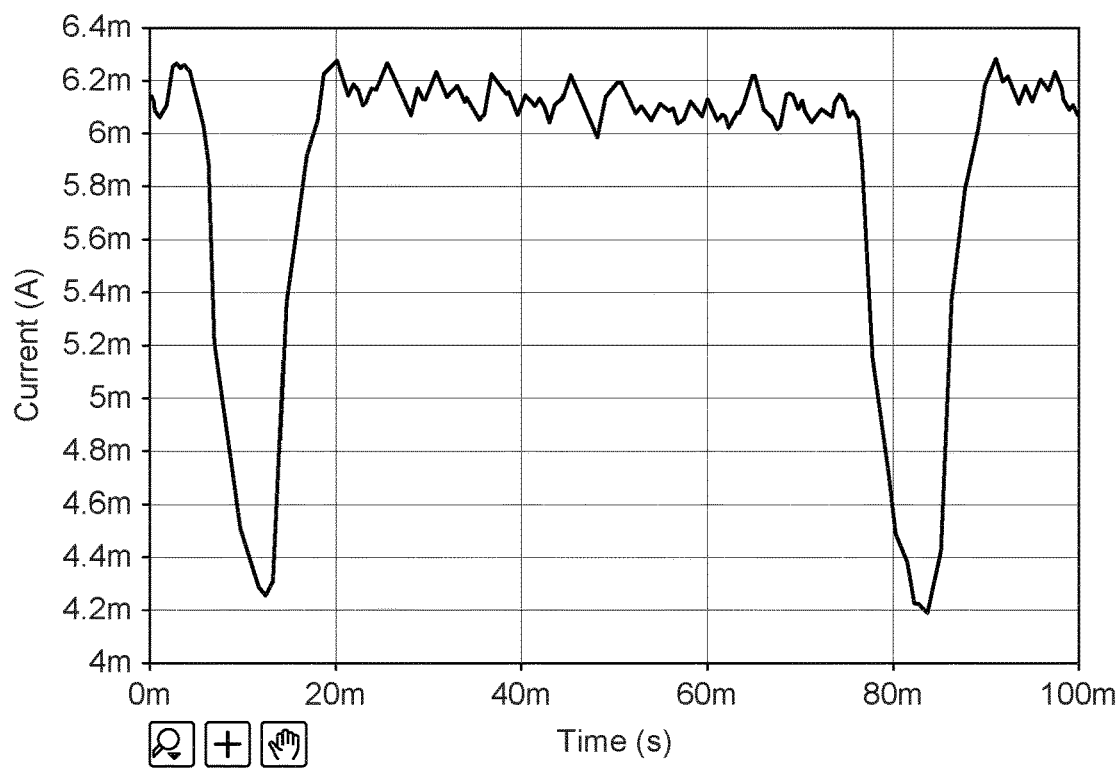
FIG. 14.2

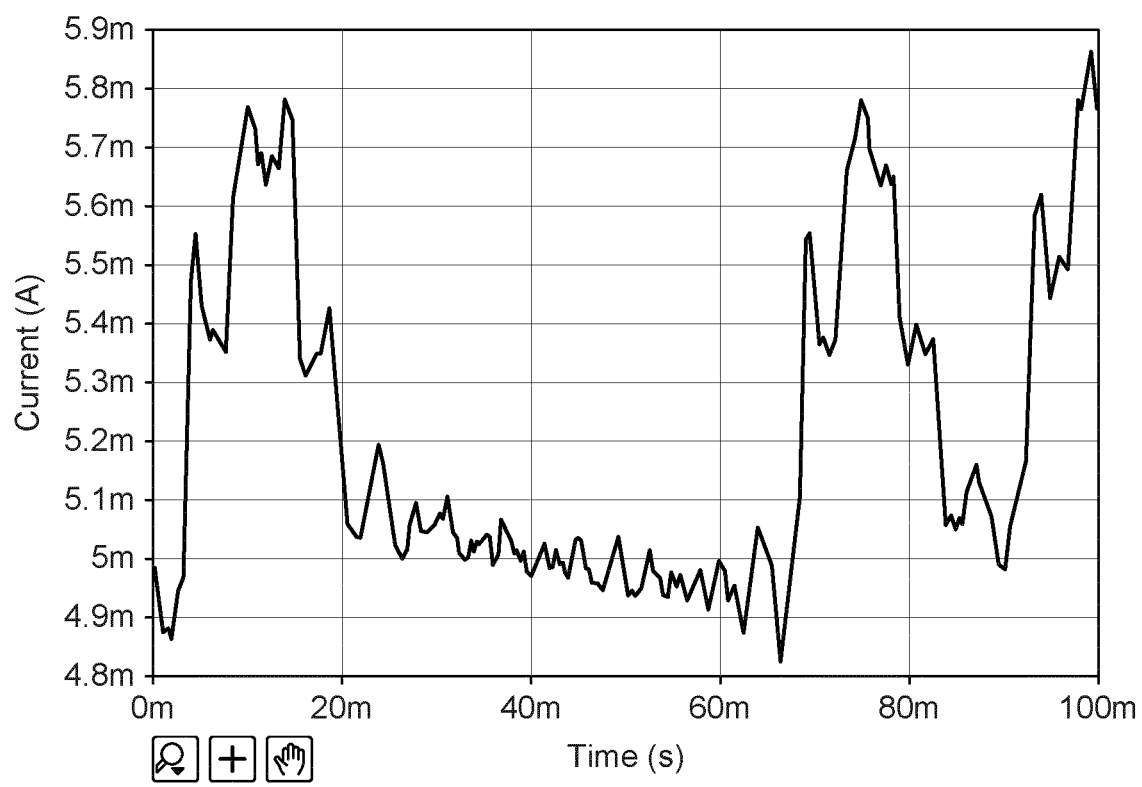
FIG. 14.3

FLUIDIC OSCILATORS

FIELD OF INVENTION

This application is a National Stage Application of PCT/EP2020/060357, filed 11 Apr. 2020, which claims benefit of Serial No. 1905126.7, filed 11 Apr. 2019 in Great Britain, and which applications are incorporated herein by reference. To the extent appropriate, a claim of priority is made to each of the above disclosed applications.

BACKGROUND ART

An oscillator is a transducer that converts a direct input into an alternating output using an energy input which is a parasitic loss. Fluidic oscillators use an impingent jet, frictional losses, and compression of the impingent jet via throttling through a nozzle/orifice. One of the simplest ways to switch a fluid is based on the principle of the Coanda effect. The Coanda effect is the inherent ability of an impingent jet to adhere to the wall of the curved surface. When a pressure differential is introduced in the system, the flow is diverted. If there is another wall on the other side of this diversion, the jet attaches to this wall due to the Coanda effect again. This flow diversion may be switched back and forth between a pair of walls and if this 'oscillation' can be maintained, a bistable fluidic oscillator is formed.

Fluidic oscillators have been based on hydrodynamic instabilities and perturbations in flowing liquids and gases. Gases can be oscillated by creating the required instabilities in the oscillator by a combination of adding a control element via a feedback control. This feedback control is via negative feedback. Most fluidic oscillators are used to either amplify or diminute the impingent jet. The switching is typically initialised by introducing instability in the form of an opposing feedback action, i.e. positive feedback for a negative feedback control, negative feedback for a positive feedback control. The control of the feedback can be introduced by the path that this flow returns. There can be a single outlet or multiple outlets from the oscillator but typically two outlets are used so that switching can take place with minimal frictional losses.

The switching between the two outlets is typically achieved by inducing a diversion of the flow by applying a return path somewhere in the geometry which can deflect the flow with minimal input of energy or minimal frictional losses. This characteristic of inducing a large-scale response for a weak input results in flow amplification and hence these devices are also known as fluidic amplifiers.

There are various types of fluidic oscillators that can be actuated in a variety of ways. The basic principle of the Coanda type jet adherence remains. Two such methods of operation are jet deflection and load switching and the vast majority of known fluidic oscillators may be characterised by and classified as using one of these methods. Both are based on the Coanda effect wall attachment mechanism. Jet deflection based systems utilise a control terminal based deflection, whereas load switching based systems require the presence of an applied load at the outputs or a mechanical device in order to induce diversion of the gaseous flow.

Examples of typical jet deflection fluidic oscillators include the Warren type, Spyropoulos type, Tesař-Zimmerman type fluidic oscillator, and the Hartmann Resonator Fluidic Oscillator. Typically, in these devices the gaseous flow enters the device through a supply nozzle and is amplified at this nozzle. Control terminals are used in combination with fluid wall attachment (Coanda effect) acting as an initiator. The control channels are connected at a region that is located post nozzle. The gaseous flow is partially diverted back due to a pressure differential arising which results in flow switching. An additional mechanism to initiate oscillation is the presence of a cusp downstream of the control channels which acts as a positive feedback via initial gaseous recirculation at the cusp.

Whilst fluidic oscillators have found many applications it is only recently that they have been used in the generation of microbubbles. Microbubbles, typically have gas-liquid interfaces sized between 1 μm and 1000 μm, and exhibit high levels of transport phenomena due to their high surface-area to volume ratio. The most popular type of fluidic oscillator in microbubble generation are those based on jet diversion.

One of the most effective fluidic oscillators for microbubble generation is the Tesař-Zimmerman Fluidic Oscillator (TZFO). The TZFO design of fluidic oscillator depends on the feedback control of the impingent wave in order to induce an oscillation based on the flow switching via the level of feedback imposed. The key innovation in the TZFO design was to provide the feedback channel in a third dimension to the other components of the oscillator; the feedback channels being arranged perpendicular to the plane of the other key components of the oscillator. This innovation allowed for a better control of the oscillator compared to other oscillators in the art and for more effective application of fluidic oscillation in microbubble generation.

Whilst the TZFO has been a highly effective fluidic oscillator for microbubble generation there is still a need for improved levels of control and improvements in microbubble generation. Present designs have their limitations and there were some drawbacks of the TZFO. Lower onset of oscillation in order to reduce effective hydraulic losses. Higher momentum of pulse i.e. higher amplitude for smaller bubble formation is desirable. Theoretically, this may be achieved by the TZFO by increasing the flow or the amplification but there is a limit to which this can be done and also increasing the flow, whilst achieving the higher momentum, results in the problem of lower onset of oscillation.

Reducing friction losses due to the smaller relief features. The TZFO (and amplified for the microscaled TZFOs) and other jet deflection type oscillators require a control nozzle along with the supply nozzle in order to oscillate. The control nozzle width has to be lower than the supply nozzle width in order to maintain the flow regime. For a standard TZFO, the smallest feature is 1400 μm (control nozzle), for a supply nozzle of 2 mm. To ensure that the flow switches and bistability is achieved, the flow needs to be switched by selectively flowing across the throat and using the amplification of the deflecting wave in the control nozzle to deflect the impingent wave. It also needs to be slightly stronger than the original wave in order to deflect it.

There is a general inability to significantly change the shape of the waveform. The waveform can be changed slightly by extending the curve via geometric changes in order to provide greater inertance to the jet, changing it into a more rectangular waveform but that is generally the limit.

The TZFO exhibits frequency variation with flow-frequency increases with increase in flow rate and this is quite marked. This is not an ideal property for a fluidic oscillator, especially for industrial applications, where flow variation during routine operation is commonplace but undesirable. The lack of change of frequency with respect to flow would be a desirable property for an oscillator for microbubble generation.

The frequency of the TZFO is inversely proportional to the length of the feedback loop. This is due to the delay introduced by the feedback loop. The longer the loop, the longer would be the cycle of delay, which would mean, longer switching time and therefore a lower frequency, which is a limitation of the TZFO.

One approach to reduce hydraulic losses is to microscale the system (i.e. initialise oscillation at a lower flowrate and therefore not require venting). However, this is highly problematic as reducing the channel widths and wall thickness of the fluidic oscillator also results in concomitant increase in backpressure and frictional losses. This is not desirable. Furthermore, due to the higher pressure of the system, it will lead to an increase in leaks which is also not desired.

It would be highly desirable therefore to identify new fluidic oscillators with new modes of operation that result in reduced hydraulic losses whilst being able to increase frequency of oscillation.

DISCLOSURE OF THE INVENTION

It has now been found that a new design of fluidic oscillator overcomes a number of the limitations of the TZFO and other fluidic oscillators and has certain new advantages. This new oscillator is termed the Desai-Zimmerman Fluidic Oscillator (DZFO).

It has been found that the new DZFO design of fluidic oscillator, which utilises acoustic chambers associated with the outlet legs of the oscillator and located downstream of the splitter region and incorporating a new mode of switching, induces high levels of oscillation control and negates the need for conventional jet induced control systems. This new design of oscillator effectively utilises an internalised feedback mechanism, which effectively shortens the feedback path and results in a significant and unexpected increase of the frequency levels that may be obtained during operation of the oscillator. There are three key parameters that impact the flow and frequency of the new oscillator. These are the length and dimensions of the acoustic chamber, the distance from the cusp or splitter to acoustic chamber inlet and the outlet conditions of the oscillator and in particular pressure.

Another important factor in providing good quality microbubbles is to maintain the amplitude during operation of the oscillator; this has typically been achieved utilising venting, which is not a sustainable solution. With the new DZFO oscillator amplitude optimization is achieved without the need for venting although selective venting may be used.

The novel DZFO oscillator works on a new mechanism as opposed to the conventional jet deflection and load switched types. The DZFO is based on an acoustic resonance mode of switching and exhibits several phenomena based on the acoustic mode which are not possible for other fluidic oscillators. The highlights of the DZFO are that it has a lower pressure drop, lower frictional losses, higher amplitude of pulse crisper waveform (very low dispersion into other modes), higher frequencies attainable (20 kHz but no upper limit found), variety of waveforms produced (saw, square wave, shark tooth, and others), and exhibits the 'beats' phenomena observed due to the unique principle of switching for this oscillator. With the DZFO flow switching was observed at 100 ml·min$^{-1}$ for a 1 mm nozzle.

This new DZFO oscillator and mode of operation enables a much wider set of operating formats and conditions to be met in order to achieve optimum microbubble generation; with this new design it is possible or easier to hit what is referred to as the "sweet spot" for microbubble generation; this new oscillator has much wider frequency control (plasticity) compared to previous fluidic oscillators and during flow variations. This lack of change of frequency with respect to flow is a highly desirable property for an oscillator for microbubble generation. Thus, the combination of the frequency elasticity with respect to a control handle and inelasticity with respect to flowrate variations are ideal combinations for microbubble generation in an industrial application. These features are not present in the unmodified TZFO.

An additional requirement is the ability to make controllable waveforms as they would be highly desirable for microbubble generation mediated by oscillatory flow, as crisper waveforms suggest better momentum transfer and therefore lower friction losses. This would result in better bubble pinch-off without the additional energy losses due to the spread of the waveform. Such waveform variation and control is achievable with the DZFO but not with the TZFO. One example of a controlled waveform that may be achieved with the DZFP but not the TZFO is a shark tooth waveform.

The new DZFO oscillator despite having these significant advantages also maintains all the useful properties of the TZFO, namely: no-moving part; generates a hybrid synthetic jet, low pressure drop, ease of frequency control, and lower frictional losses. Thus, this new fluidic oscillator retains all the advantageous properties of other oscillators but has several important features/improvements including—higher pulse amplitude (4-10 times higher), lower frictional losses, new switching mechanism, higher frequency attainable (20 kHz), constructive/destructive wave formation, asymmetric loading generated oscillations (which can be used for asymmetric gas mixing or be used with uneven loaded outputs/bubble generating spargers as an example), and lower onset of oscillation (<100 mlpm) with crisper momentum pulse transfer. These properties also make the DZFO better at microbubble generation and smaller bubbles are generated compared to other oscillators.

The DZFO is based on a new principle as compared to the typical deflection mechanisms discussed earlier about load switching or jet deflection type oscillators. The control parameters in the DZFO are based on acoustic resonators and the principle of acoustic resonance is used in order to create an oscillation which is different to both the mechanisms described previously (load switched or jet deflection). This new oscillator is based on the principle of an acoustic resonance mode. It resonates using this mode. This mode was designed to have an acoustic mode either antiparallel or parallel to the oscillator body and deflection by the channels based on the length of the resonating channels.

In the new design there is no need for the control terminal to be present as a resonating chamber is placed on the outlet legs of the oscillator post the throat nozzle. This negates the need to have control terminals and also deflect the wave by the fact that the amplified wave (amplified due to the throat nozzle) would be used to deflect the impingent wave and the length of the resonating channel would be used to control the frequency of this deflection. The mode of operation is in effect a combination of the acoustic and hydrodynamic modes and this involves the combination of the splitter acting as a positive feedback introducing a recirculation to deflect the jet and the acoustic chambers and outlets acting as the control.

Thus, the present invention provides a fluidic oscillator comprising at least one inlet port in communication with at least two outlets via a nozzle region and two outlet conduits, the two outlet conduits being separated from each other by a splitter region and each outlet conduit comprising a resonating chamber in fluid communication with the conduit.

The fluidic oscillator further comprising a cusp region at the splitter region.

The fluidic oscillator has no jet-based control terminal.

The resonating chambers may be orientated in the same dimensional plane as the other components of the oscillator. The resonating chambers may be orientated in a third dimensional plane generally perpendicular to the plane of the other components of the oscillator. The resonating chambers may be arranged in any plane and may be of any shape.

The resonating chambers may be of any desirable cross-section and preferably of a circular cross-section. The resonating chambers may be tubular with parallel walls or may be tubular with walls that are not parallel i.e. in a cone arrangement. The resonating chambers may be tubular but may be defined in having a tortuous internal path or chamber. Each chamber associated with an outlet conduit may be defined as comprising two or more sub-chambers with a common fluid outlet in communication with the outlet conduit.

The fluidic oscillator may comprise two or more resonating chambers in fluid communication with each conduit.

The fluidic oscillator may comprise two or more resonating chambers of different dimensions. The resonating chambers may be of different internal diameter length or both dimensions. These parameters may be altered or controlled to provide the 'beats' phenomenon.

The fluidic oscillator comprises an acoustic resonant mode of control and switching.

In the fluidic oscillator of the present invention the splitter, cusp, outlet conduits and acoustic resonance chambers are all downstream of the throat nozzle.

The present invention further provides a method of fluidic oscillation, which method comprises providing a fluidic oscillator having two or more arrangements for inducing the Coanda effect to a compressed jet stream, introduction of at least one compressed jet stream and switching of the compressed jet stream between each arrangement through use of an acoustically generated deflection wave generated by the jet stream in an acoustic resonance chamber associated with each arrangement.

The present invention further provides a method of fluidic oscillation, which method comprises providing a fluidic oscillator having two or more arrangements for inducing the Coanda effect to a compressed jet stream, introduction of at least one compressed jet stream and switching of the compressed jet stream between each arrangement through use of an acoustically generated deflection wave generated by the jet stream in an acoustic resonance chamber associated with each arrangement, wherein the resonance chambers are of different dimensions and the oscillator exhibits the 'beats' phenomenon.

The present invention further provides a method of microbubble generation, which method comprises introducing a gas via a manifold into a liquid and wherein the gas is provided to the manifold via a fluidic oscillator operated via acoustic resonance switching.

A present invention is exemplified and will be better understood upon reference to the following non-limiting description and examples in conjunction with the accompanying drawings in which:

FIG. 3 is a perspective view of part of the DZFO oscillator of the present invention;

Figure 4:
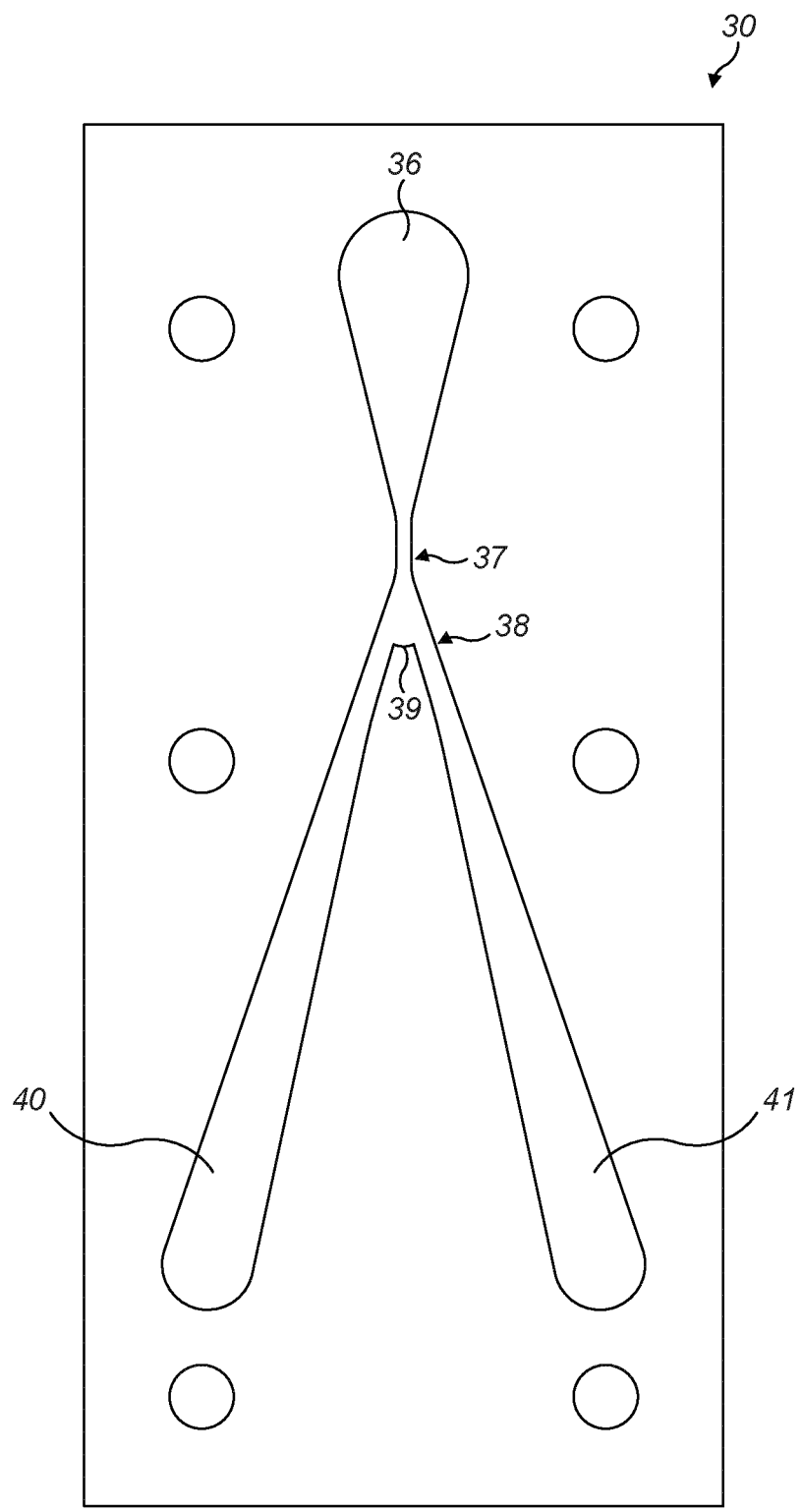
Figure 5:
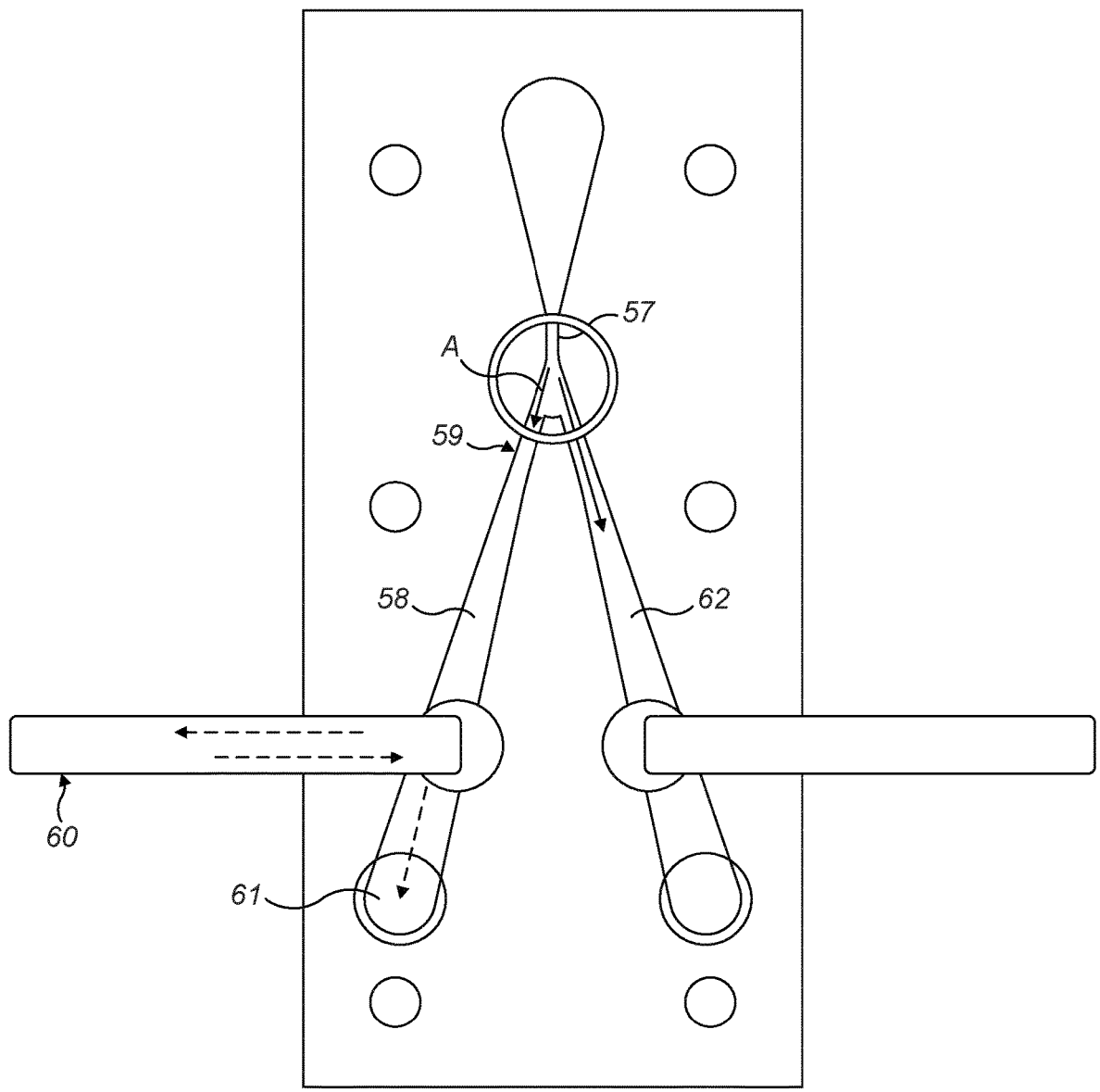
Figure 6:
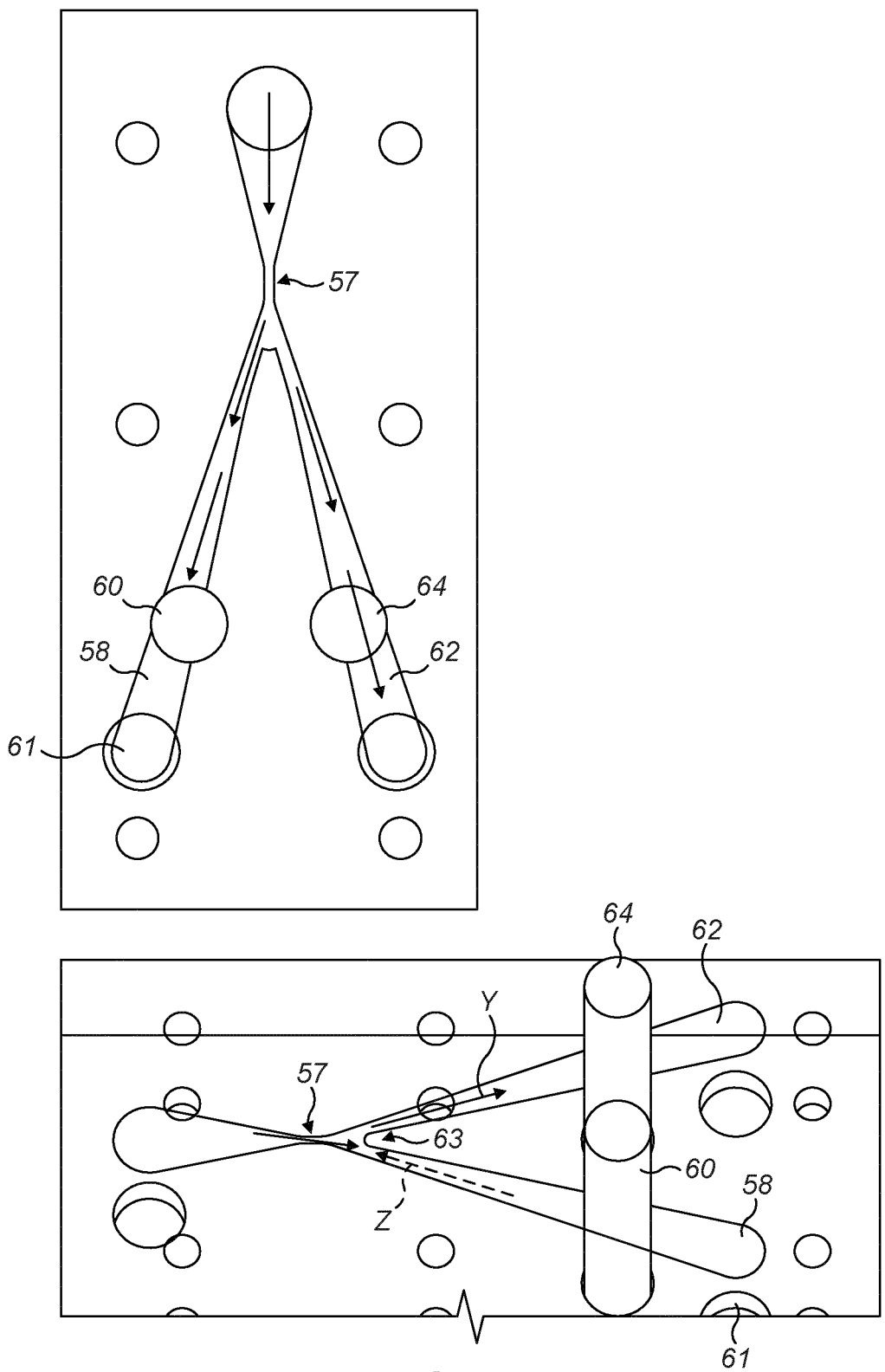
Figure 7:
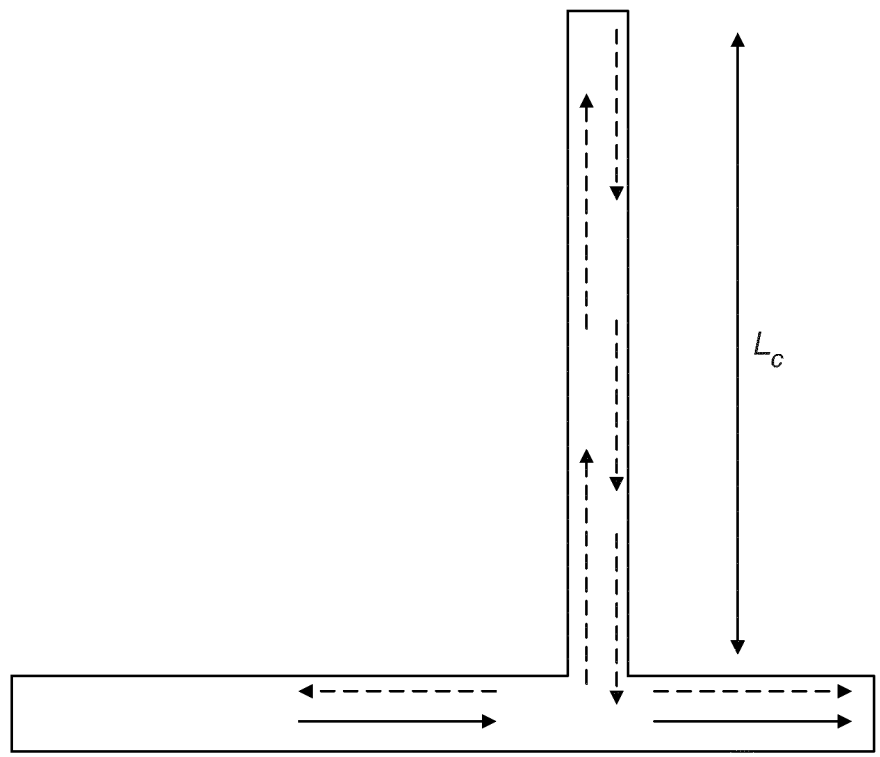
Figure 7B:
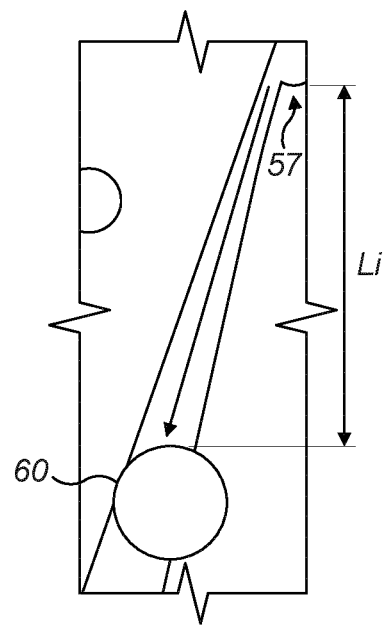
Figure 8:
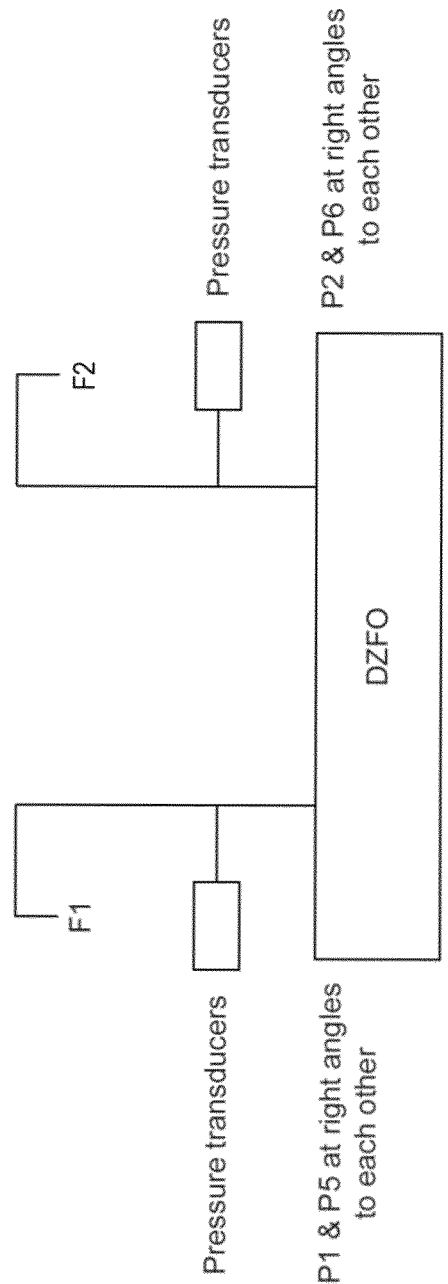
Figure 9:
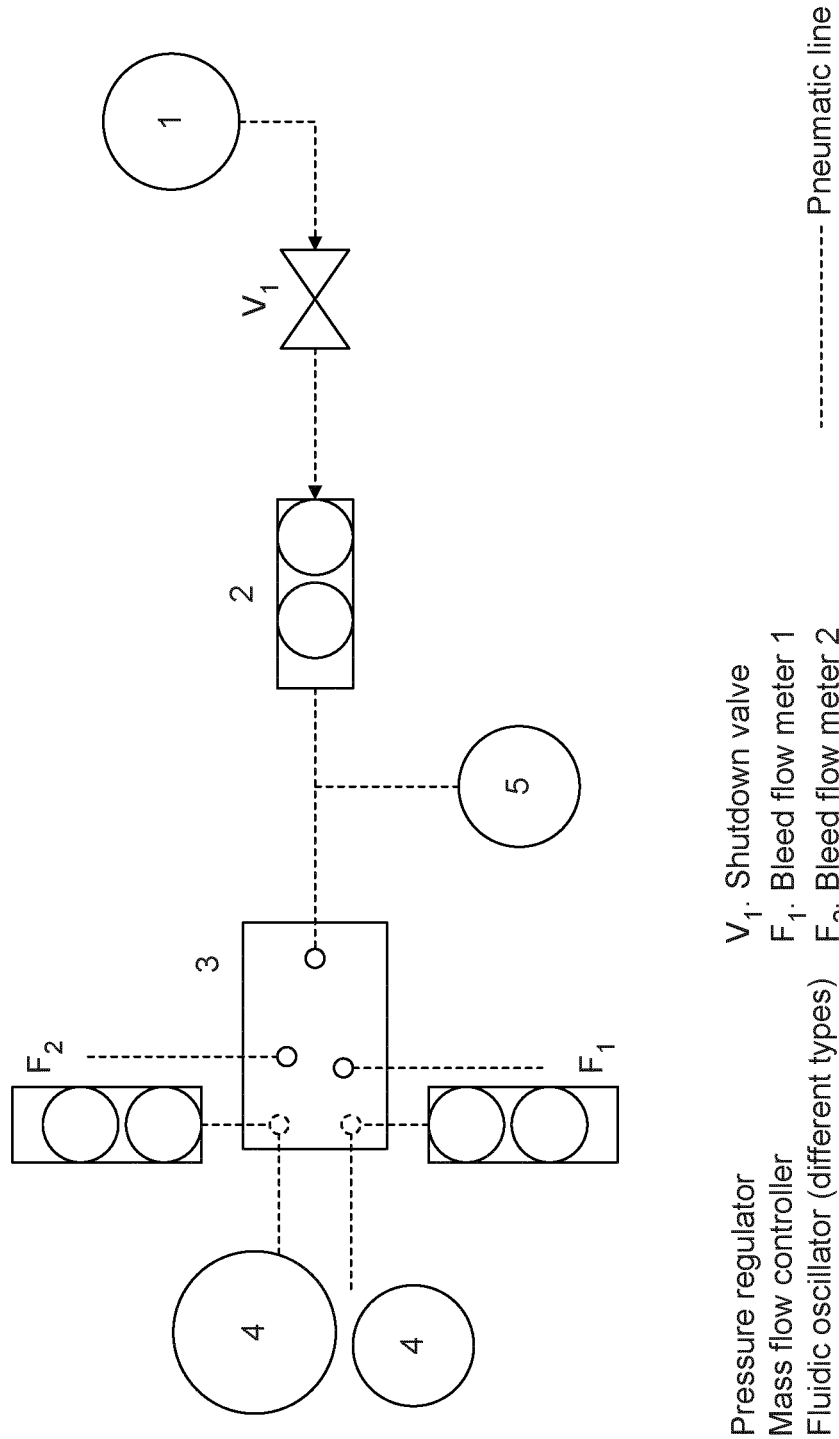

FIG. 4 a plan schematic view of part of the DZFO fluidic oscillator of the present invention;

FIG. 5 is a plan schematic view of a DZFO fluidic oscillator of the present invention illustrating the mode of its operation;

FIG. 6 is a plan schematic view of a DZFO fluidic oscillator of the present invention further illustrating the mode of its operation;

FIGS. 7 and 7b are schematic views of the DZFO illustrating the factors impacting frequency during operation;

FIG. 8 shows the experimental arrangement of pressure transducers for experimental evaluation of the DZFO;

FIG. 9 shows the pneumatic experimental set-up for testing of fluidic oscillator performance;

FIGS. 10.1 to 10.9 shows the waveform performance of various fluidic oscillators and arrangements;

FIG. 11 illustrates the frequency performance of the DZFO oscillator;

FIGS. 12.1 to 12.4 compares the waveform and frequency performance of the TZFO and DZFO;

FIGS. 13.1 to 13.6 illustrates the waveforms of the DZFO under a variety of arrangements and conditions; and FIGS. 14.1 to 14.3 shows the amplitude waveforms for a standard DZFO with equal resonating chambers and a DZFO with asymmetric resonating chamber lengths;

DETAILED DESCRIPTION

Figure 1:
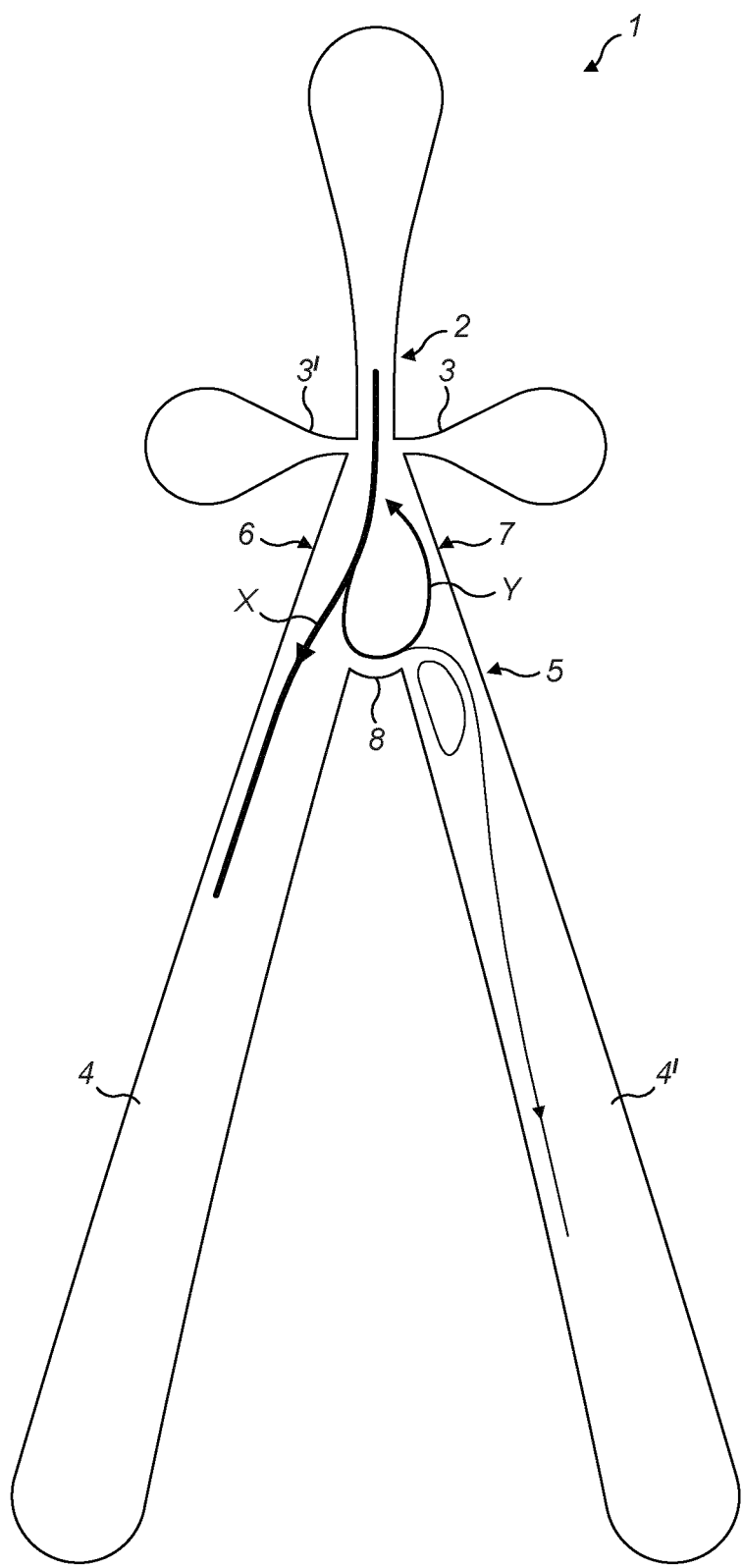
FIG. 1 is a plan schematic view of a TZFO fluidic oscillator.
Figure 2:
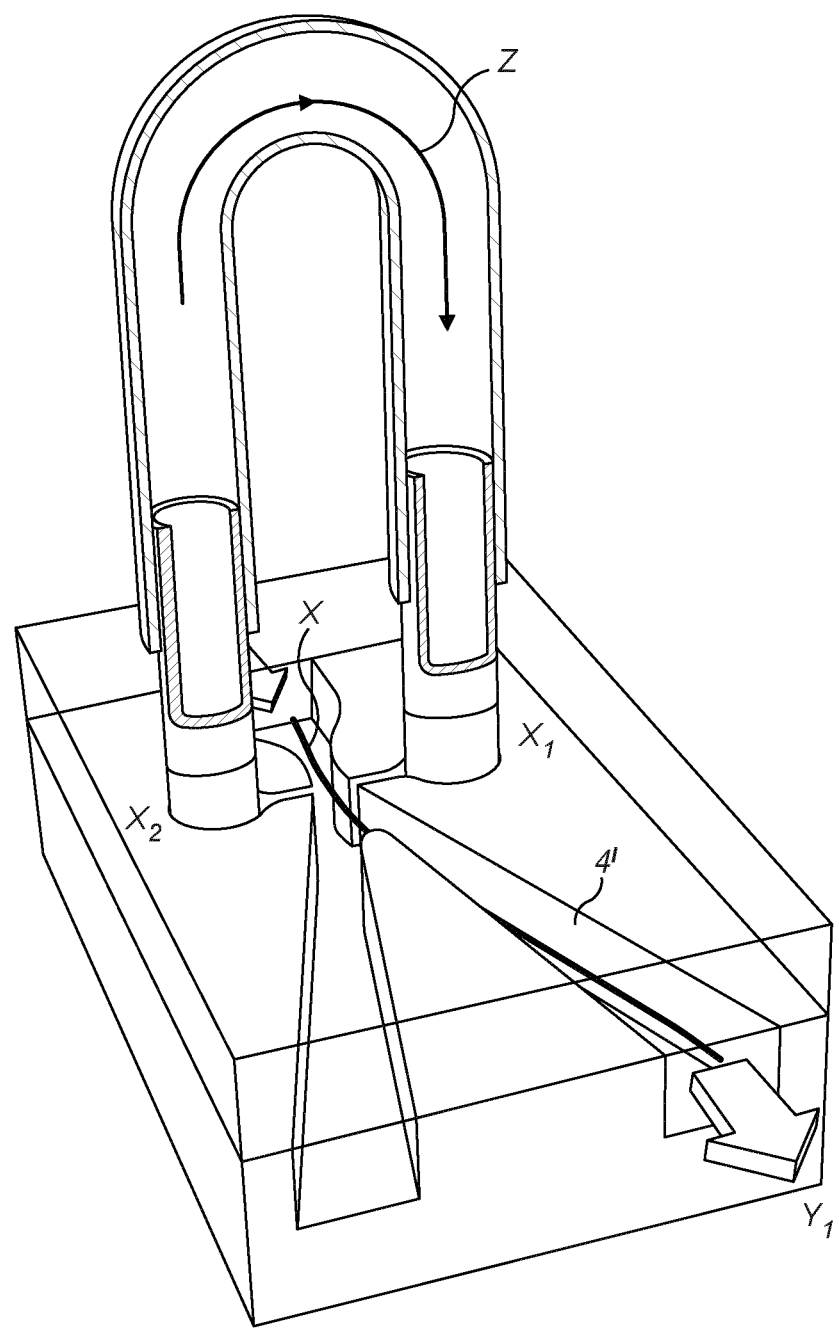
FIG. 2 is a perspective view of a TZFO fluidic oscillator.

A TZFO oscillator is illustrated in FIGS. 1 and 2, creates hybrid synthetic jets which help engender microbubbles in an economical fashion. The TZFO (1) has a supply nozzle (2), a pair of control nozzles (3,3'), a pair of outlet conduits (4,4') a splitter region (5), walls (6 and 7) and a cusp (8). In the TZFP switching is achieved via a pulsatile flow and the adherence of the jet (X) to a wall (6) due to the Coanda effect (needed for the bistability of the system) to flow along an outlet conduit (4) and its subsequent detachment to the other outlet conduit (4') and wall (7) due to a switchover created by the cusp (8). This cusp (8) is present in a region known as the splitter region (5). The cusp (8) is responsible for resisting switching and acts like a positive feedback for the system. This positive feedback needs to be overcome in order for the switching to take place. This is why there is a need for an introduction of a destabilising negative feedback which can overcome the innate positive feedback. The recirculation vortex (Y) that is created due to the cusp (8), results in the oscillation initialisation. The control nozzles (3,3') help in the switchover and are used to facilitate the change in frequency. It can be thought of as the introduction of negative feedback to the system in order to increase its instability. This instability, in fact, induces a stable oscillatory flow which can also be termed as stable bistability. Both the outlet conduits (4, 4') of the device (1) are balanced, which results in a stable system by loading the system with equi-responsive spargers (not shown) for bubble generation. FIG. 2 shows the control ports in the third dimension providing the feedback loop. The jet (x) is shown passing down outlet conduit (4'). The flow (Z) in the control port is shown flowing from high pressure port (X2) to low pressure port (X1).

FIG. 3, shows the basic external arrangement of features of the DZFO (30). The supply nozzle (31) and the outlets (32 and 33) are shown along with the two acoustic resonance chambers (34 and 35). FIG. 4, shows the internal geometry of the DZFO (30), which shows the inlet chamber (36), the nozzle region (37), the splitter region (38), the cusp (39) and the two outlet conduits (40 and 41). Importantly it can be seen that there are no control terminals associated with the nozzle region as illustrated for the TZFO in previous Figures. The features that control the frequency here are the two acoustic resonating chambers (34 and 35), placed roughly midway (can be situated anywhere along the outlet conduit) on the outlet conduits of the DZFO. The length of these acoustic chambers will determine the frequency of the oscillator.

FIGS. 5, 6 and 7 illustrate the operation and switching of the DZFO. As can be observed in FIG. 5, there is an amplified wave (A) post the throat nozzle (57). This wave (A) post the throat nozzle (57) has been deflected down outlet conduit (58) due to the Coanda effect associated with the wall (59). As the wave (A) passes down the outlet conduit (58) there is a partial deflection into the acoustic resonating chamber (60) with partial deflection to the outlet (61), and the remainder flows back depending on the ratios of the area for the different cavities. The partially deflected wave proceeds back up the outlet conduit (58) to the throat nozzle (57) and deflects the wave (A) to move across to the other outlet conduit (62). This process occurs in both outlet conduits and acoustic resonating chambers. The wave (A) oscillates between the outlet conduits (58 and 62) and there is no control port/terminal present to provide the oscillation.

FIG. 6 shows the flow diversion mechanism of the DZFO. The arrow (X) denotes the wave post the throat nozzle (57). The wave post deflection is indicated at (Y) and the arrow indicated at (Z) denotes the deflecting wave. The impingent wave (X) travels past the throat nozzle (57), and is amplified. This wave (X) then passes down the outlet conduit (58) and partially enters the resonating chamber (60) and partially continues to the outlet (61) at the end of the outlet conduit (58). The deflection frequency depends on the length of the resonating chamber (60) and each outlet conduit may have a separate control effect for the frequency depending on its length and distance between the resonating chamber (60) and the throat nozzle (57). Neglecting the flow that has passed to the output (61), the deflected wave now meets the impingent wave (X) at the splitter region (63), and this causes the flow to be diverted onto the other outlet conduit (62). The same process now occurs in the second outlet conduit (62)/resonating chamber (64) combination and the resulting oscillation is stably bi-stable.

Other ways to control the resonance include changing the cavity geometry of the resonance chamber. The length of the resonance chamber will determine the frequency of oscillation and the combination of the resonance chamber area and outlet nozzle would determine the amplitude coupled to the momentum of the impingent jet and the throat nozzle width.

The resonance chamber is used to control the frequency of oscillation. The chamber width is designed on the principle that it must be easier for the wave to flow into the resonance chamber than for the wave to flow through the outlet nozzle. Therefore, it is preferred that the internal diameter of the resonance chambers is greater than the internal diameters of the outlet nozzles of the oscillator. For example, in one embodiment the oscillator has a 1 mm throat nozzle, the resonance chambers are of internal diameter 8 mm and the outlet port has an internal diameter of 5.5 mm. losses. Because of the design of this oscillator it may have larger dimensions compared to other oscillators and this aids in reducing friction losses during use of this new oscillator. The resonance chamber may be oriented in any direction relative to the outlet conduits and will function as an acoustic chamber. The flow will be diverted back from the resonance chamber and is based on the length (Lc) of the resonance chamber.

With reference to FIGS. 7 and 7b the frequency may also be changed by changing the length (Li) of the outlet conduit between the resonance chamber (60) and the throat nozzle (57). The shorter the resonance chamber or the outlet conduit the higher is the frequency. For a zero volume for the resonator chamber cavity, there is still an oscillation possible due to the length of the leg. The resonance chamber is used to control the frequency of oscillation and also determine switching mode. As can be seen, the frequency dependency is now based on outlet conduit and resonating chamber diameter ratios, which are of much wider variation than that of the control nozzle to supply nozzle ratio in the TZFO. This results in a significant reduction in friction losses in the DZFO compared to the TZFO. The DZFO is able to attain much higher frequency switching conditions.

It has also been found that the acoustic mode of operation of the DZFO is also able to induce the phenomenon of 'beats' in order to generate larger pulses and introduce superposition principle (constructive interference) and destructive interference of the waveform, which is not observed in other designs of oscillator The fluidic oscillators of the present invention are ideally suitable for use in a wide range of applications that utilise microbubbles. They may be used for energy efficient microbubble production for various applications.

In the present invention microbubble stripping of ammonia from ammonia-water systems and ammonia rich liquor systems was evaluated using the DZFO and benchmarked with an industrial comparator (air stripping). The mass transfer rates were over 1000-3000 times higher for microbubble stripping with the DZFO compared to air stripping for ammonia-water systems and over 15000 times higher for ammonia-rich liquor. Stripping of nearly 100% ammonia was achieved in less than 30 minutes of contact time (as opposed to 95% in 100 h for air stripping), and removal of ammonia at a pH less than 9 was achieved for the first time.

Thus, the present invention further provides a method for the stripping of ammonia from an ammonia-water system, which method comprises stripping an ammonia-water system through exposure to microbubbles generated through use of a DZFO and a pH of less than 9.

EXAMPLES

The material section discusses the variety of methods and different oscillators used for the examples. The experimental method discusses the test used herein with special attention to the frequency measurements being used for the testing.

Materials and Methods

The DZFO was compared in performance to a TZFO and other fluidic oscillators. The resonance chambers for the DZFO was placed in the middle of the output conduits, with the centreline chosen to be midway between the output port and the throat nozzle.

FIG. 8 shows the placement of the pressure transducers (required to characterise the oscillators) The placement of the pressure transducers was maintained in order to measure the waveforms and frequency responses. F1 and F2 represent rotameters acting as control valves in order to simulate a 'load'. The Transducers were kept at right angles to each other in order to ensure phase variance existed.

FIG. 9 shows the pneumatic set up for the system. The set up for the system is similar to the ones used for conventional fluidic oscillation. The only difference is that there is no sparger attached to the system but rather a simulated load via metered valves or rotameters are used. This enables a more controlled experiment to be performed.

Referring to FIG. 9, air enters via the compressor with pressure regulation (1) and a mass flow controller (2) which controls the flowrate going into the fluidic oscillator. The fluidic oscillator is connected to pressure transducers (Impress G1000 and Impress GP100) (4) and metered valves (F1 and F2) which simulate the loading and the pressure transducers record the Fast Fourier Transform (FFT) of the data. The backpressure regulator (5) enables the determination of the pulse strength and the amplitude of pulse for the system. The frequency measurement is achieved via bespoke code written using LabView and described in the next subsection.

The frequency of the oscillator was determined by using a bespoke code in LabView by using power spectra. This could also be used to determine the magnitude of the pulse strength on the oscillatory wave. The code consisted of a Fast Fourier Transform (FFT) power spectrum for the raw data obtained from the pressure transducer at 128 kilo-samples per second. The FFT is a signal processing technique which, when observed with the Nyquist theorem and with sufficient sampling results in a sampling averaged frequency of a wave spectrum resulting in a peak formed for the various systems in use. The frequency of oscillation would help determine the amplitude of the wave jet engendering from the oscillator outlet into the sparger. Conventionally, an FFT suffers from averaging losses and can mistake peaks due to windowing errors. This is mitigated by using a high acquisition rate system capable of averaging several thousands of samples per second, i.e. NI DAQ type system and taking the averaging window over a longer period of time. These readings were compared with those obtained via using the Maximum Entropy Method (adapting from Numerical Recipes in C++) and a hybrid version of this method using Autocorrelation function in LabView. They compared very well and there was less than 1% discrepancy with the results in terms of frequency.

These oscillators were characterised maintaining ceteris paribus and depending on the experiment carried out, various properties such as the frequency, the waveforms, the amplitudes, the backpressures, and other items were measured.

Results and Discussions

Frequency tests were conducted, and comparisons are made (where possible) with the other oscillators—TZFO, microscaled TZFO, and another prior art oscillator called the Tippetts Capacitive Fluidic Oscillator (TCFO).

The DZFO resonated at the various stated flows and there were several features to note when compared to the other oscillators. The experiments are also presented to showcase the various features of the different oscillators and what are the unique features arising from the DZFO.

Oscillator Comparison—Characterisation

The different oscillators were trialled for performance. Performance was measured using parameters such as frequency response, waveforms generated, amplitude/magnitude of pulse, and backpressure (pressure drop across oscillator) for the same conditions imposed on each device. The testing parameters were selected based on the aims of desirable characteristics in fluidic oscillators for microbubble production.

The experiments were carried out at a standard global flowrate of 10 slpm, with the same length of the feedback introduced at 1.2 m. There were two internal diameters used for the resonance chambers, in order to introduce different levels of feedback conditions. The frequency, backpressure, and magnitude of pulse were recorded. The waveforms were also recorded in order to see the variations. Configuration 1 was for a higher level of feedback (10 mm O.D. and 8 mm I.D.) whilst configuration 2 was for a lower level of feedback (6 mm O.D. and 4 mm I.D.). FIG. 10 shows the waveforms corresponding to the conditions in Table 1. Table 1 delineates the results for this trial. TCFO configuration 2 did not oscillate. This is because, although it had been designed for these flowrates, it is the lower end of the flowrates that it would be possible to be designed for. This is due to the inability to initialise the pressurisation cycle in order to initiate the oscillation. At the lower level of feedback, the TCFO would not work and a higher flowrate was used (15 slpm) and results were noted for that condition.

FIG. 10 shows the waveforms corresponding to the conditions in Table 1 with the numbers in the S.No column corresponding to the numbers next to the waveforms in the Figure. From Table 1 it is quite evident that the DZFO has the strongest pulse strength (highest magnitude) at 0.06 and 0.5 bar(g) for the two conditions. This is approximately 3-4 times higher in magnitude than the TZFO and microscaled TZFO configurations. The magnitude of pulse for the DZFO is 10 times higher than the TCFO. This is likely due to the low flowrate and higher friction losses for the TZFO, microscaled TZFO, and TCFO.

TABLE 1

Results from the Oscillator Characterisation Study - Comparing Performance

| FIG. No. | S. No | Oscillator | I.D. of Feedback tube (mm) | Frequency (Hz) | Backpressure (bar(g)) | Magnitude of pulse (bar(g)) |
|---|---|---|---|---|---|---|
| FIG. 10.1 | 1 | TZFO 1 | 8 | 117 | 0.26 | 0.0158 |
| FIG. 10.2 | 2 | TZFO 2 | 4 | 96 | 0.26 | 0.0132 |
| FIG. 10.3 | 3 | Microscaled TZFO 1 | 8 | 121 | 0.28 | 0.0192 |
| FIG. 10.4 | 4 | Microscaled TZFO2 | 4 | 110 | 0.27 | 0.018 |
| FIG. 10.5 | 5 | TCFO 1 | 8 | 72 | 0.29 | 0.0048 |
|  | 6 | TCFO 2 | 4 | NA | NA | NA |
| FIG. 10.7 | 7 | TCFO (15 slpm) | 4 | 96 | 0.35 | 0.0125 |
| FIG. 10.8 | 8 | DZFO 1 | 8 | 112 | 0.27 | 0.06 |
| FIG. 10.9 | 9 | DZFO 2 | 4 | 101 | 0.28 | 0.05 |

The TCFO has additional requirements in terms of pressurisation, which further reduces the pulse strength at the output and results in a dispersion of the wave. This is due to the compression effects observed for the capacitance or cavity filling. Microscaled TZFO has a higher pulse strength as compared to the TZFO as the flow is amplified due to the smaller channels. So, the amplification ratio, i.e. the velocity of the exit jet is higher, which leads to a higher magnitude of pulse but also concomitant higher backpressure.

This means that the TCFO would not be effective for microbubble generation. Also, the performance of the TCFO, a load switch based, Zalmanzon type oscillator is extremely different from the performances of the jet deflection based in the TZFO and microscaled TZFO and the new type of oscillation mechanism of the DZFO. The backpressure reflects the loading on the oscillators. Whilst the flowrate is not high enough to cause significant frictional losses, there is still a difference that can be observed for the various systems. The DZFO has a throat of 1 mm, the TZFO has throat of 1 mm and 0.7 mm control nozzle width, the microscaled TZFO has a throat of 0.5 mm and control nozzle width of 0.35 mm and the TCFO has 1 mm and 4 mm channels. The mechanism of load switching results in higher backpressures, the jet deflection results in similar levels of backpressures whereas the new mode of oscillation results in a similar level of backpressure but much higher magnitude of pulse, which is highly desirable.

When the flowrates are increased to 20 slpm, the TZFO has a backpressure of 0.57 bar(g), the microscaled TZFO has a backpressure of 0.89 bar(g), the DZFO has a backpressure of 0.47 bar(g), and the TCFO has a backpressure of 0.81 bar(g). This indicates that the mechanism of switching is different for the different groups and also demonstrates how quickly the TCFO and the microscaled TZFO incur the friction penalties due to these losses and pressure drops. This then results in a dispersal of the waveform and a weaker bubble pinch-off pulse.

The frequency responses are comparable for each other. The crispness of the waveforms for the different oscillators is seen in FIGS. 10.1 to 10.9 (there is no Figure for S.No. 6). The TZFO and the microscaled TZFO have similar waveforms and show dispersion to other modes. The DZFO has a crisp and clear waveform. There is little or no dispersion of the wave. The TCFO also shows dispersion in other modes and not a crisp waveform. Also, it suffers from interference from the previous cycle, i.e. the compression effects that result in a secondary peak formed which is smaller in amplitude but very close in frequency. However, when the flowrate is increased, the waveform gets crisper although the reverberating/returning wave also correspondingly gets stronger as seen in FIG. 11.

High Frequency and Presence of the Third Harmonic 2

In previous results the Hartmann Resonator Oscillator attained a frequency response of 1800 Hz and the highest achievable frequency for the TZFO has been between 300 Hz and 670 Hz. The TCFO has been able to achieve 270 Hz-300 Hz as a frequency response. The microscaled TZFO had been able to achieve 870 Hz-990 Hz for the different types of configurations used but the b=0.5 mm (the one used in these trials) has been able to achieve a maximum of 860 Hz. Scaling it down further gets the frequency up at 1800 Hz for b=0.1 mm but the channels are small and prone to clogging that it shall not be possible to use that device for any practicable purposes.

An experiment was carried out to find out the highest frequency that could be attained by the individual oscillators. The TZFO, microscaled TZFO, and TCFO attained the frequencies well below 1000 Hz.

Figure 11A:
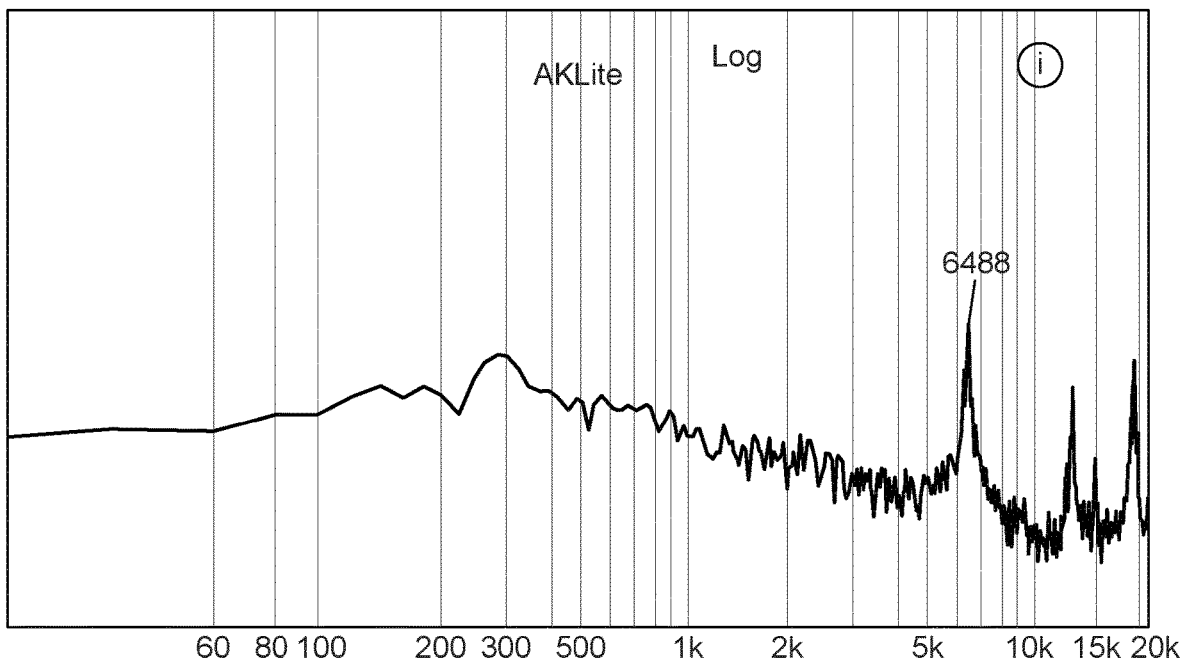
Figure 11B:
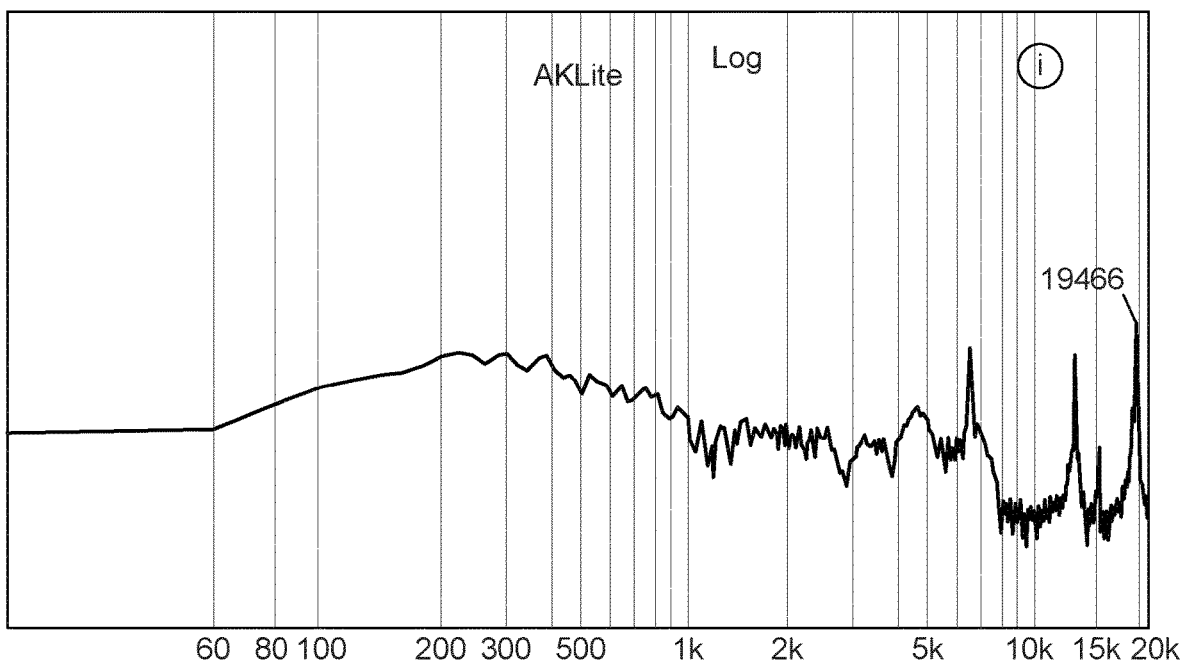

FIG. 11 shows the primary frequency attained and the third harmonic excitation achieved for the DZFO. Piezoelectric speaker/microphone had to be used to measure the frequency instead of the frequency measuring set up as the pressure sensors were not sensitive enough due to the pulse strength being very low. The flowrate for the DZFO was 1 slpm. A frequency of 6,488 Hz is the primary frequency and 19,466 Hz as a third harmonic excitation (having a higher amplitude than the prime harmonic) is observed for the DZFO. This can be seen in FIG. 11a (primary frequency) and FIG. 11b (excitation of the third harmonic). This is significantly higher than any other oscillator observed especially with a channel width of 1 mm for the throat nozzle. The primary frequency is attained is significantly higher than the other oscillators. The third harmonic excitation then increases it to almost 20 kHz. Higher frequencies for the third harmonic are also possible but are limited by measurement limitations. This provides more evidence that the acoustic mode is guiding the oscillation as physical switching of waves at such low flows (1 slpm) and low back pressure of 39 mbar is very unlikely. Other oscillators have not been able to oscillate at such low flowrates.

This acoustic mode also allows substantially higher frequencies attainable as compared to the other oscillators including the jet deflection based Hartmann Resonator fluidic oscillator which can attain a maximum of 3.6 kHz based on the excitation of the third harmonic, whereas the prime frequency attained by the DZFO is 6.8 kHz, which when excited, can attain approximately 20 kHz. Additionally, whilst it was required to severely increase the flow rate of the Hartmann Resonator oscillator in order to attain that frequency and the flow rate was not measurable anymore, the DZFO was able to achieve that frequency at 1 slpm.

Additionally, the Hartmann Resonator fluidic oscillator requires 0.27 g/s of mass air flow (>200 slpm) as a minimum in order to start oscillating and a much higher rate in order to achieve the third harmonic excitation as opposed to the DZFO which attains it at 1 slpm, which is 0.02 g/s. This is 3 orders of magnitude different which differentiates it from the other oscillator. The DZFO can also attain this at 100 ml·min$^{-1}$.

Better Bubble Generation Due to Lesser Friction Losses

An indicator for friction loss and the hypothesis for better bubble pinch off is the presence of a crisper waveform and no dispersion to the other harmonics. This can be seen in FIGS. 12.1 to 12.4, which shows the FFT and raw magnitude waveforms obtained for microscaled TZFO (12.1 and 12.2) at 4 slpm, and the FFT and raw magnitude waveform for the DZFO (12.3 and 12.4) at 4 slpm. The other oscillators did not work at these flowrates. 4 slpm is the lowest flowrate that the microscaled TZFO can oscillate. Whilst the waveforms obtained for the microscaled TZFO FIGS. 12.1 and 12.2 show wide FFT peaks and fairly broad magnitude waveforms (which indicate friction loss and dispersion into other resonant modes), the waveforms obtained for the DZFO, FIGS. 12.3 and 12.4 have a higher magnitude and pulse strength as well as are crisp with the FFT showing sharp peaks and the raw magnitude waveform is crisp and clear. This indicates a much lower friction loss and almost no dispersal into the other resonant/harmonic modes.

The peak obtained at 1 slpm, still looked well preserved with sharp peaks and low dispersals whereas none of the oscillators would oscillate at such a flowrate. The frequency of approximately 20 kHz confirms an acoustic mode of switching since load switching at such frequencies is impossible. There is a phase shift observed which links well with the mode of oscillation and the FFT is also clearly delineated.

Comparisons in Terms of Waveforms and Outlet Leg Lengths

It is believed that the new mode of operation will result in reduction in friction losses and will translate into better bubble production by increasing amplitude of pulse, higher frequencies achieved and reduce the bubble size thereby increasing bubble throughput.

A comparison was made in order to determine the pressure drop across the DZFO i.e. backpressure, the amplitude of the pulse generated by the oscillator, the frequency of the oscillator and the magnitude of the pulse previously. And to determine whether the distance from the chamber of the oscillator to the outlet would have any impact on the pulse strength of the system which is a proxy for bubble formation when coupled with frequency.

Changing the chamber surface area to volume ratio, i.e. smaller I.D. tubes as resonating chambers, would induce an artificial increase in the frictional losses of the system (increasing level of feedback). This is analogous to the resonating chamber for the DZFO.

The conditions that were kept constant were the standard flow rate of 10 slpm, the length of the resonating chamber—120 cm, and the distance of the distance of the outlet leg where the pressures were also measured. The waveforms were recorded at the outlet and the end of the tube depending on the distance—The 100 cm, 300 cm, and 600 cm.

The configurations tested were for i. 6 mm OD resonator (4 mm ID) and ii. 10 mm OD resonator (8 mm ID).

The backpressure for (0.28 bar(g)) and the frequency (101 Hz) for (i) and (0.27 bar(g)) and frequency of 112 Hz for (ii) remained the same as per the previous experiment and seen in Table 1.

FIGS. 13.1 to 13.6 show the different waveforms. Configuration (i) is shown in FIG. 13.1 and corresponding to 100 cm distance, FIG. 13.2 corresponding to 300 cm distance, and FIG. 13.3 corresponding to 600 cm distance. Configuration (ii) is listed next with FIG. 13.4 corresponding to 100 cm distance, FIG. 13.5 corresponding to 300 cm distance, and FIG. 13.6 corresponding to 600 cm distance. For each image, i.e. FIG. 13.1, the waveforms on the top, which are extremely crisp correspond to those for the pressure transducer placed at the outlet leg of the oscillator, and the one on the bottom corresponds to the tube post the distance correspondingly.

Although the shape of the waveform changed slightly showing that attachment of the jet was changing with less interference from harmonic waves by increasing the distance between impingent wave, amplified wave and reflected wave, the frequency stayed the same and was controlled by the resonator rather than the distance. For configuration (i) there was a slight change (less than 3 Hz) which can be attributed to the LI fraction changing. Magnitude of pulse is equal to 0.025-0.05 bar. For configuration (ii) there was a slight change (less than 2 Hz) which can be attributed to the LI fraction changing. Magnitude of pulse is equal to 0.05-0.06 bar.

The waveforms are crisp and get 'cleaner' with increase in length of outlet shows that the interference is reduced from the backscatter and reflections which improves the switching mechanism. The reduction in interference results in a much cleaner raw waveform. This supports the acoustic basis of the mechanism in the DZFO.

The bubble size is reduced with lower friction and increased pulse strength. The bubble size for configuration (i) average bubble size—60 μm-average number, and 210 μm-average volume. The bubble size for configuration (ii) average bubble size—30 μm-average number, and 160 μm-average volume.

The change in the average bubble size is not distance dependent for these distances. This shows that for a reduced friction loss, there is smaller bubble generation. The possibility for a larger difference in the bubble size generated between the two configurations can be likely attributed to the low overall friction losses across the DZFO, which then result in a larger difference between the two configurations as opposed to that for the TZFO.

The bubble size for the comparable oscillators is seen in Table 2 and follows conditions from Table 1. However, the TCFO has only one condition since it does not oscillate for Condition 6, and Condition 7 has a higher flowrate which is not a fair comparison for bubble size studies as they will be larger than the other oscillators. These points are single values and have been placed here as indicative bubble sizes.

TABLE 2

Oscillator Comparing Bubble Sizes

| S. No | Oscillator | I.D. of Feedback tube (mm) | Frequency (Hz) | Number Average Bubble Size (μm) | Volume Average Bubble Size (μm) |
|---|---|---|---|---|---|
| 1 | TZFO 1 | 8 | 117 | 93 | 227 |
| 2 | TZFO 2 | 4 | 96 | 115 | 420 |
| 3 | Microscaled TZFO 1 | 8 | 121 | 51 | 175 |
| 4 | Microscaled TZFO2 | 4 | 110 | 72 | 310 |
| 5 | TCFO 1 | 8 | 72 | 168 | 495 |
| 8 | DZFO 1 | 8 | 112 | 30 | 160 |
| 9 | DZFO 2 | 4 | 101 | 60 | 210 |

Table 2 shows that the TCFO is not ideal for bubble size reduction and this is likely due to the returning wave observed with this oscillator, which interferes with bubble generation. It also has only a single output, which increases the frictional losses associated with it for bubbling. The TCFO, TZFO, and microscaled TZFO show a similar trend to the DZFO in terms of the bubble size in terms of the feedback level on them and the impact of frictional losses on the system. However, this is not as prominent on the TZFO and the microscaled TZFO as compared to the DZFO. The DZFO has a smaller bubble size as compared to the others for this test. A frequency sweep has not been performed which means it is likely not the resonant frequency ('sweet spot') that is operating currently. The higher amplitude of the DZFO is likely impacting the bubble size and this can be seen here. The microscaled TZFO, which has a higher amplitude as compared to the TZFO, has smaller bubbles generated. The TCFO has larger bubbles due to the lower amplitude generated by the oscillator.

The bubble size distribution obtained by the DZFO is narrower than the bubble size obtained for the other oscillators. This is also likely due to the higher amplitude of the DZFO, as it prevents conjunctions and coalescence of the bubbles leaving the orifice.

The waveform of the DZFO, as seen in FIG. 13 and the other oscillators seen in FIG. 10, show that the crisp and clear waveform generated by the DZFO, is likely impacting the bubble size. The TZFO and microscaled TZFO have similar waveforms and generate bubbles of a similar size. The TCFO has a waveform that has a lot of losses due to dispersion into the other modes, (the TZFO and microscaled TZFO also face that problem but less so), and this can be seen in the waveform and the bubble size.

Different Possible Waveforms Generated and 'Beats' Dynamics.

The different possible waveforms being generated by the DZFO indicate that it is extremely likely that the mechanism proposed for the DZFO is accurate. Several different types of waveforms are possible to be generated, with different shapes and features including 'beats' dynamics. Saw type, shark tooth, square waves, and others are possible using the DZFO.

This is a feature as yet not available or possible in other fluidic devices. There has been some work on coupling fluidic devices to get waveforms and there is an attachment principle involved but bubble detachment via this process may be even more efficient than previously obtained due to the sharp peaks obtained which look ideal for bubble formation.

The DZFO is based on an acoustic mode for switching and therefore there are several acoustic effects that can be exploited with this device. This can be used to adapt the DZFO for a variety of applications where this is required, or subharmonic frequencies are required—gas mixing operations and use as a valve. The delay added here makes for an extremely simplified circuit making it highly maneuverable.

The output signal is higher than what would normally be obtained for a symmetric configuration of resonant chambers and this can be tuned further for specific applications.

An example is presented in FIGS. 14.1 to 14.3. Amplitude waveforms for the system for standard DZFO (FIG. 14.1) with equal resonating chambers—maximum amplitude at 6.2 mA and minimum amplitude of 4.6 mA as a non-dimensionalised parametric response, FIG. 14.2 showing principle of constructive interference due to asymmetric chamber lengths with maximum amplitude at 6.2 mA and minimum amplitude at 4.1 mA and FIG. 14.3 showing asymmetric chambers but the principle of destructive interference (not entirely destructive as that would convert it to steady flow) with a maximum amplitude of 5.8 mA and minimum amplitude of 4.9 mA.

The phenomenon of beats can then be translated into microbubble generation in viscous liquids as this has not been achieved in an energy efficient manner. The rise velocity of a bubble in a highly viscous liquid is low, and this is a problem unless the impingent jet has a high amplitude that imparts momentum to the bubble. The higher pulse strength would ensure bubble detachment overcoming conventional bubble forces and forcing the bubble to detach for highly wetting or highly viscous liquids easily.

Low oscillation frequencies such as those achieved by the Vortex fluidic oscillator (2-10 Hz) or high frequencies as achieved by the Hartmann Resonant fluidic oscillator (350-400 Hz) are easily achieved by the DZFO but this brings about the possibility of even partial/fractional frequencies.

The asymmetry introduced to the bistable device also creates another interesting phenomenon. Unequal pulsations on each output leg can be used for other purposes such as ratio-controlled operations or ratio based mixing or disproportionate gas mixing (i.e. inexpensive way of mixing gases to achieve 75%/25% mixtures and 25%/75% mixtures). Each outlet conduit will have positive output and a negative cycle, but the asymmetric nature of the pulse ensures unequal mixing but controlled mixing. This can also be used amongst other things for flow diversion, controlled vapour release, heat transfer and recovery applications as well as for energy harvesting.

The ability of the acoustic mode of the oscillator of the present invention to achieve various types of waveforms presents a unique opportunity to generate bubbles of specific sizes. The mechanism of the oscillator flow mediated bubble generation requires that the peak of the wave is sharp since a flatter peak indicates a longer detachment period. If the amplitude can be high enough to detach the bubble (which is one of the major features of the DZFO), and if the waveform can be made to resemble a triangular or shark tooth type waveform, then there is a high possibility for much smaller bubble formation and when combined with the 'sweet spot' conditions for the design and operation of the DZFO might generate even smaller bubbles.

The 'beats' characteristics of the DZFO help potentially attain fractional frequencies, which in pulsed air flow means, a steady flow plugged with a gas reversal. The 'beats' can also significantly increase the pulse strength and amplitude, which when combined with the low frequencies, can result in a much better bubble generating device than previously available. The flow reversal can be utilised for multiporous/mesoporous spargers to introduce a lubrication effect as observed for the ionic liquids and result in smaller bubble sizes. The higher amplitude can be used in combination with higher frequencies using the superposition principle and then generate much smaller bubbles at higher frequencies for membranes with slits.

The asymmetric oscillations, another unique feature of the DZFO, provide another positive proof that the acoustic mode is active and the DZFO behaves as a single system as opposed to two independent resonators. This can be used to generate several types of control valves and gas mixing possibilities with simple fluidic control (different resonant chambers) to generate the bubbles. The waveforms start to merge into a larger rectangular wave train. This, coupled with the similarity of the pulse strength also signifies a lower frictional loss as opposed to the wave merging and reverberation seen in the TCFO waveform. In the TCFO, the waveforms are unequal due to the frictional losses accompanying the capacitive step, whereas for the DZFO, the waveforms are equal, but with different frequencies, which show a combinatorial step as opposed to a reverberation and signify a single system.

The DZFO has exhibited: Improved pulse strength—amplitude (4-10 times that of comparable oscillators), low pressure drop switching i.e. efficient oscillation, larger relief features (1 mm instead of 0.2-0.7 mm) for mass manufacturability, lower onset of oscillation (oscillates at 1 slpm), high downturn ratio, smaller bubbles generated due to a combination of these features, various possibilities and modalities with waveforms including beats, asymmetric oscillations, higher momentum transfer for pulse, lower dispersion into other modes (crisper and cleaner waveforms generated), higher frequencies attainable (20 kHz), and lower friction losses.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular where the indefinite article is used, the specification is to be understood as contemplating plurality as well as singularity, unless the context requires otherwise. Features, integers, characteristics, compounds described in conjunction with a particular aspect, embodiment or example of the invention are to be understood to be applicable to any other aspect, embodiment or example described herein unless incompatible therewith. Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A fluidic oscillator comprising at least one inlet port in communication with at least two outlets via a nozzle region having no control terminals and two outlet conduits, the two outlet conduits being separated from each other by a splitter region comprising a cusp region configured to create a circulation vortex, and each outlet conduit comprising an acoustic resonance chamber in fluid communication with each outlet conduit, wherein each acoustic resonance chamber is configured to induce oscillation control.

2. The fluidic oscillator of claim 1, wherein the resonating chambers are orientated in a same dimensional plane as other components of the fluidic oscillator.

3. The fluidic oscillator of claim 1, wherein the fluidic oscillator has a first plane, and the resonating chambers are orientated in a plane generally perpendicular to the first plane of the fluidic oscillator.

4. The fluidic oscillator of claim 1, wherein the resonating chambers comprise a circular cross-section.

5. The fluidic oscillator of claim 1, wherein the resonating chambers are tubular with parallel walls.

6. The fluidic oscillator of claim 1, wherein the resonating chambers are tubular with non-parallel walls.

7. The fluidic oscillator of claim 1, wherein the resonating chambers are tubular with a tortuous internal path or chamber.

8. The fluidic oscillator of claim 1, wherein the resonating chambers comprise two or more sub-chambers with a common fluid outlet in communication with the outlet conduit.

9. The fluidic oscillator of claim 1, comprising two or more resonating chambers in fluid communication with each conduit.

10. The fluidic oscillator of claim 1, wherein the two or more resonating chambers are of different dimensions.

11. The fluidic oscillator of claim 1, wherein an internal diameter of the resonance chambers is greater than internal diameters of outlet nozzles of the oscillator.

12. A method of fluidic oscillation, which method comprises introducing at least one fluid at a controlled flow rate into a fluidic oscillator according to claim 1.

13. A method as claimed in claim 12, wherein the fluid is one or more gasses.

14. A method as claimed in claim 12, wherein the fluid is one or more liquids.

* * * * *